United States Patent
Saito et al.

(10) Patent No.: US 8,699,652 B2
(45) Date of Patent: Apr. 15, 2014

(54) CONTROL ROD FOR NUCLEAR REACTOR AND METHOD OF MANUFACTURING CONTROL ROD

(75) Inventors: Yuuji Saito, Yokohama (JP); Mitsuharu Nakamura, Yokohama (JP); Makoto Ueda, Yokohama (JP); Yoshinori Katayama, Yokohama (JP); Motoji Tsubota, Fujisawa (JP); Satoko Tajima, Yokohama (JP); Yoshiji Karino, Kamakura (JP); Kenichi Yoshioka, Yokohama (JP); Kosaku Tsumita, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 1214 days.

(21) Appl. No.: 12/034,966

(22) Filed: Feb. 21, 2008

(65) Prior Publication Data
US 2008/0205574 A1     Aug. 28, 2008

(30) Foreign Application Priority Data

Feb. 22, 2007 (JP) ............................... P2007-042444
Dec. 13, 2007 (JP) ............................... P2007-321907

(51) Int. Cl.
*G21C 7/06* (2006.01)
(52) U.S. Cl.
USPC .......................................... 376/236; 376/327
(58) Field of Classification Search
USPC ................................................ 376/327, 236
See application file for complete search history.

(56) References Cited

U.S. PATENT DOCUMENTS

| | | | | |
|---|---|---|---|---|
| 5,276,718 A | * | 1/1994 | Ueda | 376/220 |
| 6,285,728 B1 | * | 9/2001 | Ueda et al. | 376/327 |
| 6,470,061 B1 | * | 10/2002 | Helmersson | 376/333 |
| 6,654,438 B1 | * | 11/2003 | Gotoh et al. | 376/327 |

FOREIGN PATENT DOCUMENTS

| | | | | |
|---|---|---|---|---|
| JP | 59-017192 | | | 1/1984 |
| JP | 60076288 A | * | | 4/1985 |
| JP | 01312492 A | * | | 12/1989 |
| JP | 02266293 A | * | | 10/1990 |
| JP | 07-128474 | | | 5/1995 |
| JP | 2505829 | | | 4/1996 |
| JP | 9-113664 | | | 5/1997 |
| JP | 09-504863 | | | 5/1997 |

* cited by examiner

*Primary Examiner* — Timothy A Brainard
(74) *Attorney, Agent, or Firm* — Oblon, Spivak, McClelland, Maier & Neustadt, L.L.P.

(57) ABSTRACT

A control rod for nuclear reactors includes four wings including neutron absorbers containing hafnium, a front end structural member which has a cross shape in cross section and includes brackets bonded to the leading ends of the wings, and a terminal end structural member which has a cross shape in cross section and includes brackets bonded to the tailing ends of the wings. The four wings are bonded to a wing-bonding member including a cross-shaped center shaft so as to form a cross shape. The front end structural member and the wing-bonding member are made of a zirconium alloy. The wings include neutron-absorbing plates having neutron-absorbing portions and each have an outer surface which is opposed to a fuel assembly and at which a hafnium-zircaloy composite member covered with zircaloy is disposed. The neutron-absorbing plates are opposed to each other with trap spaces disposed therebetween.

19 Claims, 29 Drawing Sheets

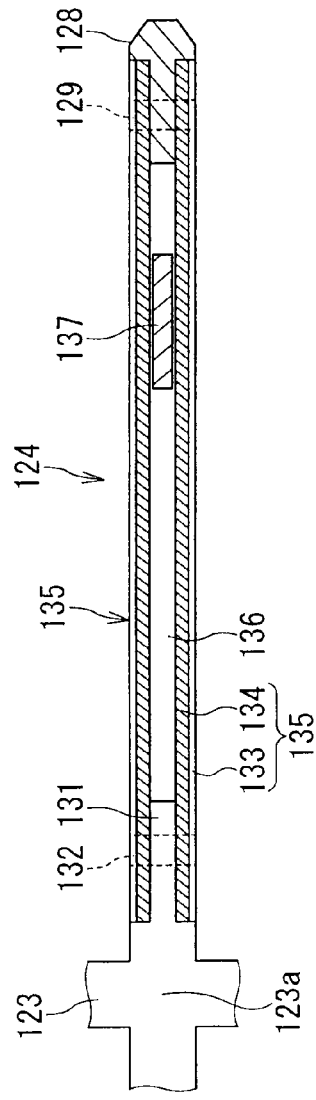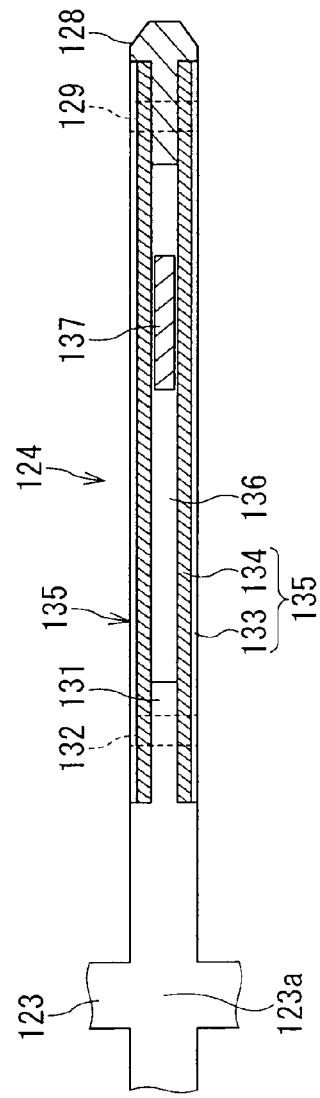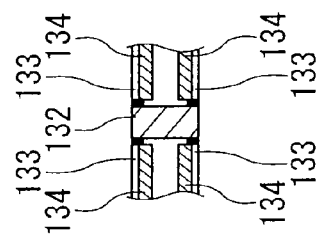

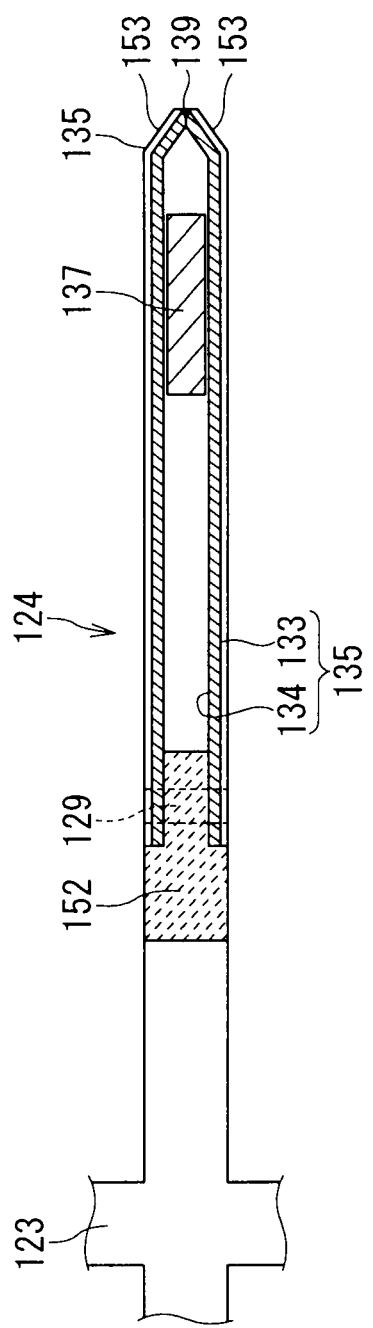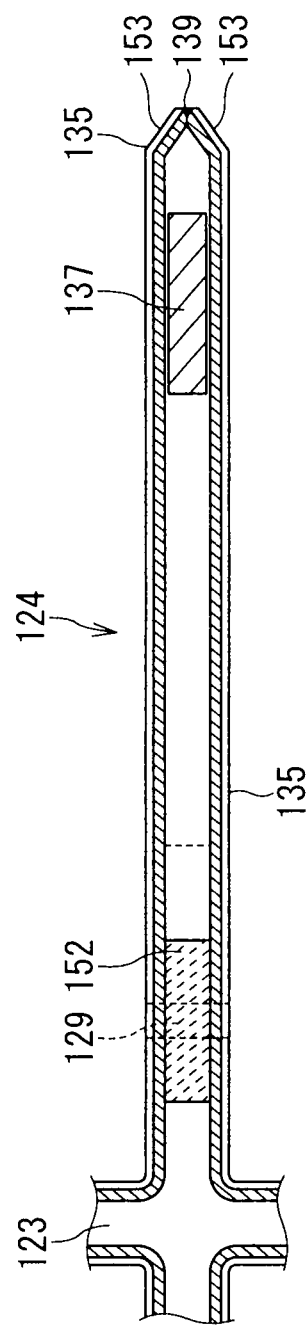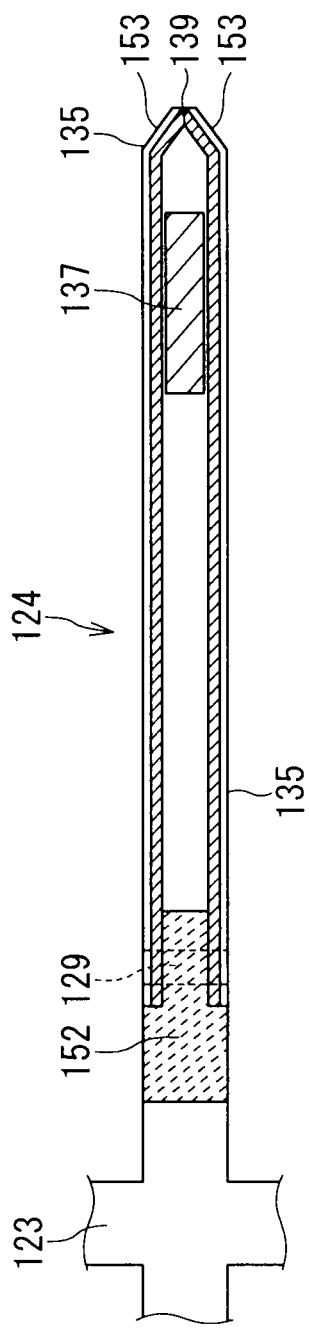

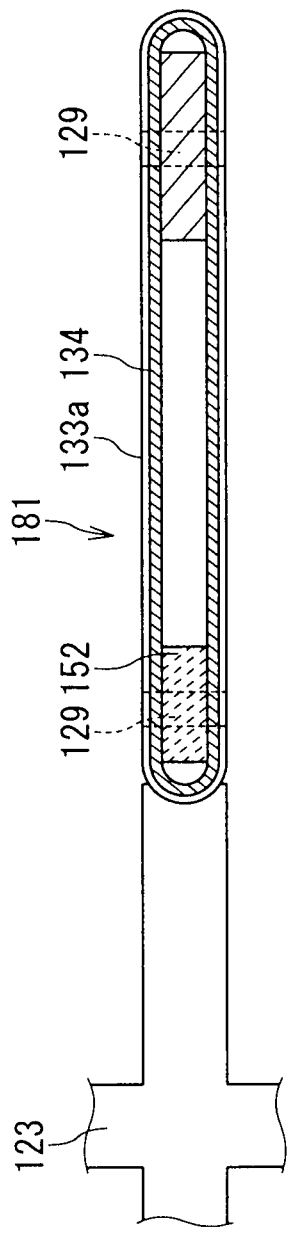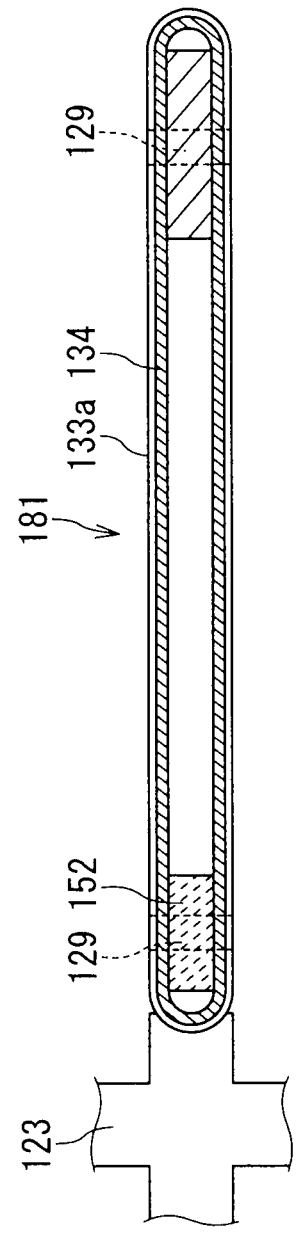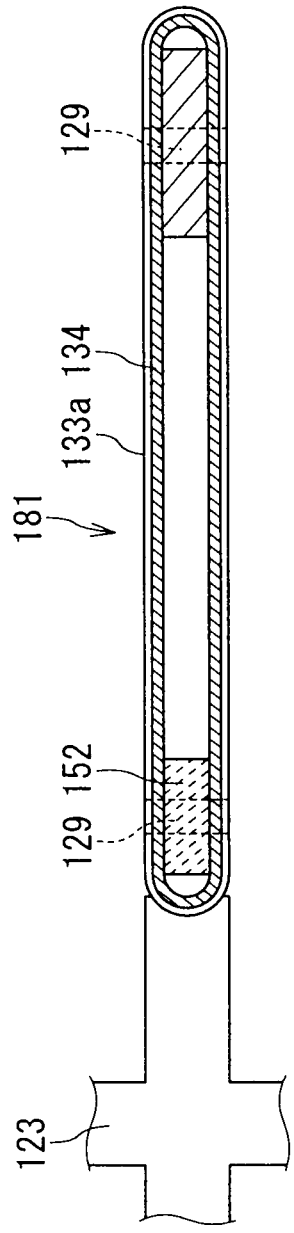

CONTROL ROD FOR NUCLEAR REACTOR AND METHOD OF MANUFACTURING CONTROL ROD

BACKGROUND OF THE INVENTION

1. Field of the Invention

The present invention relates to a control rod for nuclear reactors such as boiling water reactors and also relates to a method for manufacturing such a control rod.

2. Related Art

One example of a conventional control rod having a long life for boiling water reactor (BWR) is shown in FIGS. 30 to 32 with reference numeral of 200 as disclosed in Japanese Unexamined Patent Application Publication No. 63-8594 (hereinafter referred to as Patent Document 1) or a publication by M. Ueda, T. Tanzawa, and R. Yoshioka of "Critical Experiment on a Flux-Trap-Type Hafnium Control Rod for BWR", Transaction of the American Nuclear Society, vol. 55, p. 616 (1987) (hereinafter referred to as Non-patent Document 1). Each control rod 200 includes four wings 207, each of them including a sheath 201, made of stainless steel (SUS), having a U-shape in cross section.

Namely, FIG. 30 shows a control rod 200 for a nuclear reactor such as boiling water reactor (BWR). The control rod 200 includes, for example, a tie rod 202 connecting a front end structural member 203 to a terminal end structural member 204, the wings 207 radially extending from the tie rod 202, and a plurality of neutron absorbers 210 arranged in parallel to the axis of the tie rod 202. The front end structural member 203 includes guide rollers 203a and a handle 211 located at an end of the front end structural member 203. Each of the wings 207 includes a sheath 201 having an outer end portion with a U-shape in cross section and has cooling holes 209. The neutron absorbers 8 are accommodated in the sheaths 201.

The control rod 200 shown in FIGS. 31 and 32 is a conventional flux trap-type hafnium control rod 200, which is known to have a long life. The flux trap-type hafnium control rod 200 includes the wings 207 including sheaths 201, hafnium plates 205 accommodated in these sheaths 201, and a tie rod 202. The hafnium plates 205 function as neutron absorbers, are made of hafnium or a hafnium alloy, and are disposed in separated sections of each wing 207 that are arranged in parallel to the axis of the wing 207. Each pair of the hafnium plates 205 are opposed to each other. The respective hafnium plates 205 have different thicknesses depending on the amount of neutrons absorbed by the separated sections. This allows the hafnium plates 205 to have a uniform life.

With reference to FIGS. 31 and 32, the hafnium plates 205 are fixed to the inner surfaces of these sheaths 201, which form shells of these wings 207, with fixing pieces 208 by welding. These sheaths 201 are fixed to this tie rod 202 by means of spot welding.

In the flux trap-type hafnium control rod 200, since the fixing pieces 208 are fixed to these sheaths 201 by means of welding, these sheaths 201 are slightly recessed toward the hafnium plates 205 because of welding distortion. This can eliminate spaces between the hafnium plates 205 and these sheaths 201 and can cause these sheaths 201 and the hafnium plates 205 to be tightly fixed to each other. In this case, any space for absorbing a corrosive component is not present between the hafnium plate 205 and these sheath 201 and a large stress may be applied to the sheath 201 because the hafnium plate 205 cannot be displaced from the sheath 201 although the thermal expansion and irradiation growth of the hafnium plate 205 are different from that of the sheath 201. In the flux trap-type hafnium control rod 200, the hafnium plate 205 is fixed to the sheath 201 with the fixing piece 208 by welding as described above. The welded portion receive relatively large load such as scrum load during operation. The fixing of the fixing piece 208 by means of welding can develop residual tensile stress around the welded portion to cause stress corrosion cracking in the sheath 201 located near the welded portion. This leads to a reduction in the life of the flux trap-type hafnium control rod 200 and may threaten the safety of nuclear reactor.

Japanese Unexamined Patent Application Publication No. 9-113664 (hereinafter referred to as Patent Document 2) also discloses a control rod, manufactured by means of welding, for the BWR. However, Patent Document 1 discloses no technique for reducing residual stresses caused by welding.

In the flux trap-type hafnium control rod 200, each pair of the hafnium plates 205, which are opposed to each other, are disposed in one of the sheaths 201 and a distance between each hafnium plate 205 and the corresponding sheath 201 is maintained with the fixing pieces 208. The welding of the sheaths 201 to upper portions of the fixing pieces 208 causes thin portions of the sheaths 201 to be recessed toward the hafnium plates 205 to develop the residual tensile stress in the sheaths 201.

If the flux trap-type hafnium control rod 200 is used in such a state, the residual tensile stress may cause stress corrosion cracking in the sheaths 201 in cooperation with high-temperature water. The distortion of the sheaths 201 due to welding may eliminate spaces between the sheaths 201 and the hafnium plates 205 to cause crevice corrosion. This leads to a reduction in the reliability of the flux trap-type hafnium control rod 200.

Furthermore, the sheath 201 has an aperture fitted over a projecting portion of the narrow tie rod 202 having a cross shape in cross section and also has an inner space containing the pair of hafnium plates 205 that are neutron absorbers. Each of the wings 207 has a leading portion 211 bonded to a front end structural member 203 and a tailing portion bonded to a terminal end structural member 204.

In the control rod 200, the space between the hafnium plates is filled with water in a nuclear reactor. The reactor water moderates neutrons, which are therefore efficiently absorbed by the hafnium plates 205. Therefore, the hafnium plates 205, which are expensive and heavy, can be saved because of the presence of the reactor water between the hafnium plates 205. The space therebetween is called a trap or a trap space.

The hafnium plates 205 are spaced from each other in the axial direction of the control rod 200, which is inserted into or withdrawn or removed from the nuclear reactor, because the amount of hafnium contained in the hafnium plates 205 located closer to the entrance of the nuclear reactor may be small. The hafnium plates 205 are fixed to the sheaths 201 with fixing pieces 208, referred to as space/load-retaining members, disposed therebetween.

No techniques for preventing stress corrosion cracking are disclosed in conventional technical documents. The hafnium plates 205 are spaced from each other in the axial direction of the control rod 200 and have different thicknesses. However, there are problems in that an increase in the number of the hafnium plates 205 leads to an increase in manufacturing cost and the hafnium plates 205 are nonuniform in mechanical strength in the axial direction (that is, the hafnium plates 205 located at lower positions have lower mechanical strength).

The sheaths 201 are located close to the hafnium plates 205 and therefore the control rod 200 is under corrosive conditions because the stainless steel used to make the sheaths 201 has electrochemical properties different from those of hafnium in the hafnium plates 205. Furthermore, the control rod 200 suffers from corrosion because the atmosphere in the nuclear reactor is corrosive.

Japanese Unexamined Patent Application Publication No. 58-147687 (hereinafter referred to as Patent Document 3) discloses a hafnium control rod including no sheath. The hafnium control rod has a structure for solving a problem that hafnium and stainless steel cannot be welded to each other. The hafnium control rod includes a tie rod made of stainless steel. However, no measure against corrosion or no measure against a problem, called blade history, are disclosed in Patent Document 3.

A long-life control rod is mostly inserted in a nuclear reactor in high-power operation. Therefore, portions of fuel assemblies that are adjacent to neutron absorbers have a low neutron flux level and therefore burn slowly. Hence, fissionable content in the fuel assembly portions is relatively large. When the long-life control rod is withdrawn from nuclear reactor, a large amount of energy is generated. This influences on the health of the fuel assemblies.

This problem may be called blade history. The prevention of a reduction in neutron flux is effective in solving this problem and usually reduces the reactivity worth of the long-life control rod, thereby causing a shortage in reactivity worth.

Conventional control rods have been used in commercial reactors to exhibit satisfactory irradiation resistance. However, it has become clear that the conventional control rods are susceptible to stress corrosion cracking and are electrochemically activated. In order to use the conventional control rods in nuclear reactors for a long time, problems caused by a difference in irradiation growth or a difference in thermal expansion need to be solved and the following problem also needs to be solved in such a manner that a reduction in reactivity worth is suppressed, i.e., a problem that fuel assemblies adjacent to the conventional control rods generate a large amount of power when the conventional control rods are removed from the nuclear reactors (that is, a problem that blade history is serious).

Furthermore, it is desired that neutron-absorbing plates are improved in manufacturability, have a uniform structure in the axial direction thereof, and are reduced in manufacturing cost.

SUMMARY OF THE INVENTION

The present invention was conceived in consideration of the circumstances encountered in the prior art mentioned above and an object of the present invention is to provide a control rod, having a long life, for nuclear reactors and also provide a method of manufacturing such control rod.

The present invention is effective in preventing stress corrosion cracking, effective in reducing electrochemical activation, effective in reducing blade history, effective in improving axial mechanical strength distribution, and effective in enhancing manufacturability.

The above and other objects can be achieved according to the present invention by providing, in one aspect, a control rod for a nuclear reactor including a neutron absorber of a composite member including a hafnium plate and at least one zirconium plate bonded to the hafnium plate.

This aspect may include the following embodiments.

The neutron absorber may have a cross shape in horizontal cross section.

The zirconium plate may be disposed on a surface of the neutron absorber which contacts reactor water.

The control rod may further include wings fixed with fixing members in a thickness direction of each wing, wherein the fixing members are disposed at positions in a vicinity of bases of the wings and arranged in a longitudinal direction.

The control rod may further include wings fixed with fixing members in a direction of a base of each wing, wherein the fixing members are disposed at positions arranged in a longitudinal direction and located at the bases of the wings which are opposed to each other.

The control rod may further includes a terminal end structural member and a front end structural member including a handle, wherein the wings are formed from the composite member so as to provide a cross shape and the front end structural member is fixed to upper portions of the wings with the fixing members or the terminal end structural member is fixed to lower portions of the wings with the fixing members. The front end structural member may be formed from the composite member.

The above object can be also achieved by providing, in another aspect, a method for manufacturing the control rod, which includes a neutron absorber of a composite member including a hafnium plate and at least one zirconium plate bonded to the hafnium plate, the method including the steps of:

shaping the composite member such that the composite member have a rectangular tubular shape and the zirconium plate is located outside the hafnium plate;

forming a rectangular tube by welding both end portions of the composite member to each other, the end portions being arranged in a longitudinal direction of the composite member; and shaping the rectangular tube such that the rectangular tube has a cross shape in horizontal cross section.

This aspect may include the following preferred embodiments.

The manufacturing method may further include a step of placing fixing members for fixing in a thickness direction of each wing of the neutron absorber at positions located in a vicinity of bases of the wings and arranged in a longitudinal direction to prevent distortion of a rectangular tube having a cross shape in horizontal cross section.

The manufacturing method may further include a step of placing fixing members for fixing in a direction of a base of each wing at positions arranged in a longitudinal direction and located at the bases of the wings which are opposed to each other to prevent distortion of a rectangular tube having a cross shape in horizontal cross section.

The above object can be achieved also by providing, in a further aspect, a control rod for nuclear reactors including:

four wings including neutron absorbers containing hafnium;

a front end structural member which has a cross shape in cross section and includes brackets bonded to leading ends of the wings; and a terminal end structural member which has a cross shape in cross section and includes brackets bonded to tailing ends of the wings, wherein the four wings are bonded to a wing bonding member including a cross-shaped center shaft so as to form a cross shape in such a manner that the wings are spaced from each other at predetermined intervals in an axial direction, at least the front end structural member and the wing bonding member are made of a zirconium alloy containing hafnium of which the hafnium content is greater than or equal to that of natural compositions, the wings have principal portions including neutron absorbing plates having neutron absorbing portions made of a hafnium-zirconium alloy diluted with hafnium or zirconium and each have an outer surface which is opposed to a fuel assembly and at which a hafnium-zircaloy composite member covered with zircaloy is disposed, the neutron-absorbing plates are opposed to each other in such a manner that trap spaces in which reactor water is present are disposed between the neutron absorbing plates, and a thickness of each neutron absorbing plate is substantially uniform in a direction in which the control rod inserted or withdrawn.

In this aspect, the following preferred embodiment may be further provided.

The control rod may further include tie rods, disposed in the wings, for connecting the front end structural member and the terminal end structural member to each other, wherein the neutron-absorbing plates are mounted in the wings so as to slide from the leading ends toward the tailing ends of the wings or from the tailing ends toward the leading ends of the wings. The tie rods may be made of hafnium.

The control rod may further include wing end reinforcing members which are disposed in the trap spaces between the neutron absorbing plates and which slides in the axial direction of the control rod. The wing end reinforcing members may be made of hafnium.

Each of the neutron absorbing portions may have a first portion extending from the leading end of the neutron-absorbing portion and having a length equal to 1/24 to 2/24 of a length of the neutron absorbing portion, a second portion extending from the first portion and having a length equal to a difference obtained by subtracting the length of the first portion from 1/4 to 1/2 of the length of the neutron absorbing portion, and a third portion extending from the tailing end of the neutron absorbing portion, in which the second portion has a width greater than that of the third portion, and an outer end of a leading portion of each wing is aligned with that of a tailing portion of the wing. The first portion may have a width less than that of the second portion.

The control rod may further include a hafnium-zircaloy composite material and short narrow hafnium rods, wherein the hafnium-zircaloy composite material is repeatedly mount-folded and valley-folded so as to provide mount-folded and valley-folded portions which are arranged at equal intervals and which extend in parallel to each other, the valley-folded folded portions are brought close to each other so that the folded hafnium-zircaloy composite material has a cross shape in horizontal cross section, and the hafnium rods are arranged in end portions of the wings in form of spacers. The control rod may further include a tie cross made of zircaloy, wherein the valley-folded portions partially have longitudinal holes regularly and intermittently arranged in the axial direction and portions of the tie cross are arranged above and below the longitudinal holes so as to maintain the cross shape and improve mechanical strength.

The control rod may further include short narrow hafnium rods functioning as spacers, wherein the four hafnium-zircaloy composite members are bent so as to provide an L-shape, bent portions of the hafnium-zircaloy composite members are brought close to each other so as to be directed to a center of a cross shape, and the hafnium rods are attached to end portions of the bent hafnium-zircaloy composite members. The control rod may further include a tie cross made of zircaloy, wherein the bent portions partially have longitudinal holes regularly and intermittently arranged in the axial direction and portions of the tie cross are arranged above and below the longitudinal holes so as to maintain the cross shape and improve mechanical strength.

Each of the wings may be formed so that two of the hafnium-zircaloy composite members are opposed to each other with a space therebetween and spacers for keeping spaces are fixed to both ends of the hafnium-zircaloy composite members in an inserting or withdrawing direction and a perpendicular direction, and the four wings are bonded to a tie cross including a cross-shaped center shaft so as to form a cross shape in such a manner that the wings are spaced from each other at predetermined intervals in the axial direction.

Each of the wings may be formed so that one of the hafnium-zircaloy composite members is bent so as to provide a U-shape with a space, and a plurality of short spacers are fixed to end portions of the bent hafnium-zircaloy composite member located on the side close to a cross-shaped center shaft included in a tie cross, the tie cross is spaced from the wing at a predetermined distance in the axial direction, and the four wings are bonded to each other so as to form a cross shape.

Each of the wings may be formed so that one of the hafnium-zircaloy composite members is bent so as to provide a cylindrical shape, both end portions of the bent hafnium-zircaloy composite member are bonded to each other to form a cylinder, which is then pressed into a flattened tube, and a plurality of short spacers are fixed to outer end portions and inner portions of the flattened tube, the inner portions being located on the side close to a cross-shaped center shaft, which is included in a tie cross, and the four wings are bonded to form a cross shape so that the tie cross is spaced from the wings at a predetermined distance in the axial direction.

The wings may be fixed with members, located in a vicinity of end portions of the cross-shaped center shaft for preventing the wings from being opened.

The spacers, made of hafnium, disposed in the outer end portions of the wings may be short rods and center portions of the short rods are fixed to the hafnium-zircaloy composite members.

According to the present invention of the characters mentioned above, the control rod is effective in suppressing stress corrosion cracking and/or electrochemical activation. When the control rod is used in a nuclear reactor, the inconveniences, encountered in the prior art, caused by a difference in irradiation growth or a difference in thermal expansion can be solved and the reduction in reactivity worth is suppressed, which can solve a problem that a fuel assembly adjacent to the control rod generate a large amount of power when the control rod is removed from the nuclear reactor (i.e. a problem of serious blade history). The neutron-absorbing plates can be processed so as to have a uniform thickness in the axial direction, thereby improving manufacturability, reducing manufacturing cost, and enhancing mechanical health.

The nature and further characteristic features of the present invention will be made clearer from the following descriptions made with reference to the accompanying drawings.

BRIEF DESCRIPTION OF THE DRAWINGS

In the accompanying drawings:

FIGS. 12A, 12B and 12C are sectional views of the control rod taken along the line A1-A1, the line B1-B1 and the line C1-C1, respectively, of FIG. 11;

FIGS. 16A, 16B, and 16C are sectional views of the wing taken along the line A3-A3, the line B3-B3 and the line C3-C3, respectively, of FIG. 15;

FIGS. 27A, 27B and 27C are sectional views of the wing taken along the line A7-A7, the line B7-B7 and the line C7-C7, respectively, of FIG. 26;

DESCRIPTION OF THE PREFERRED EMBODIMENTS

Control rods, according to embodiments of the present invention, for nuclear reactors will now be described with reference to the accompanying drawings.

Further, it is to be noted that terms "upper", "lower", "right", "left" and like terms are used herein with reference to the illustrations of the drawings or in an actual charged state of a control rod.

First Embodiment

Figure 1:
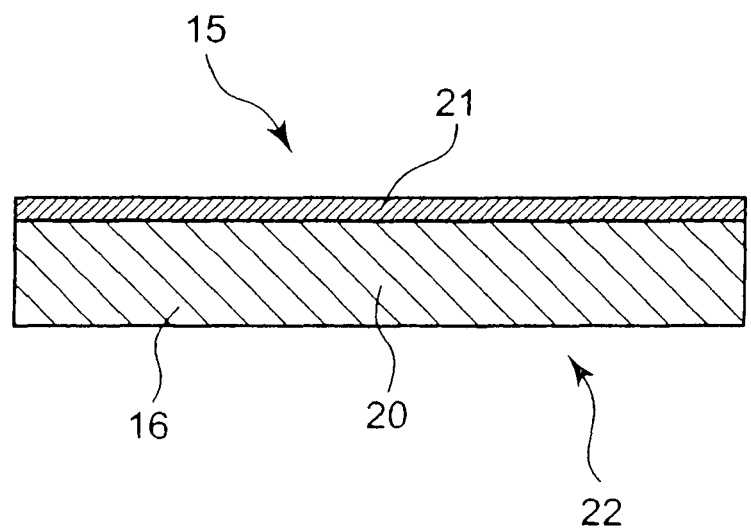
FIG. 1 is a partial sectional view of a neutron absorber included in a control rod according to a first embodiment of the present invention.
Figure 30:
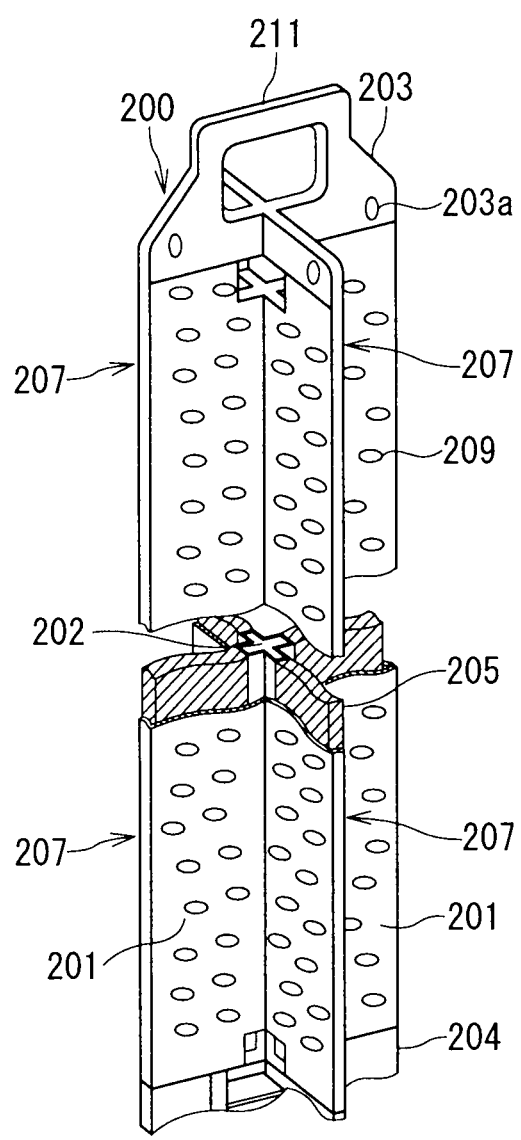
FIG. 30 is a perspective view of a conventional control rod.

FIG. 1 is a partial sectional view of a neutron absorber 16 included in a control rod 15 according to a first embodiment of the present invention. The control rod 15 itself has a general structure such as shown in FIG. 30. The neutron absorber 16 includes a hafnium plate 20 bonded to a zirconium plate 21 by means of hot rolling or the like. The hafnium plate 20 and the zirconium plate 21 form a composite member 22.

Figure 31:
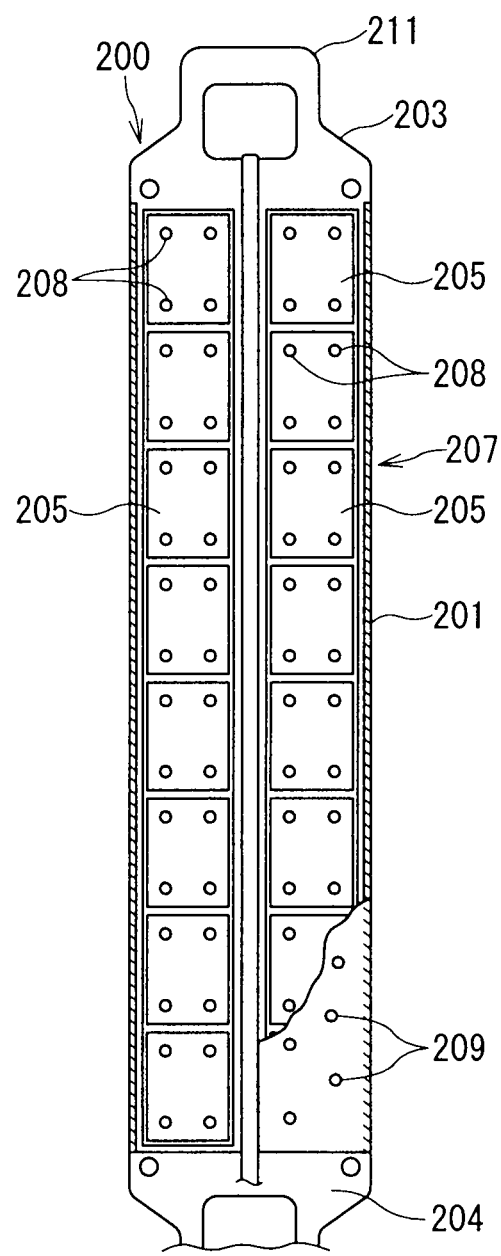
FIG. 31 is a horizontal sectional view of a conventional control rod.
Figure 32:
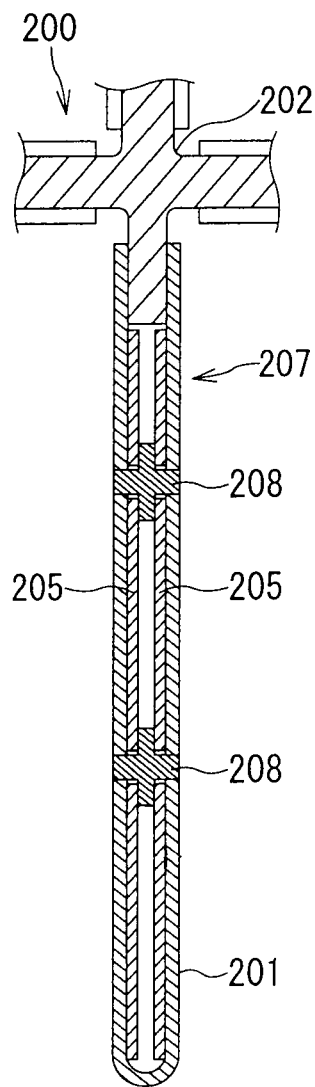
FIG. 32 is a vertical sectional view of a conventional control rod.

A conventional control rod, of the structure mentioned with reference to FIGS. 30 to 32, for example, includes U-shaped sheaths having fitting portions, hafnium plates, and supporting pieces having projecting portions bonded to the fitting portions by TIG welding. If the conventional control rod is exposed to high-temperature water in a nuclear reactor in such a state that the U-shaped sheaths have high residual tensile stress due to welding, stress corrosion cracking occurs in the U-shaped sheaths to deteriorate the performance of the conventional control rod.

However, according to this embodiment, the control rod 15 includes the composite member 22, which includes the hafnium plate 20 and the zirconium plate 21 bonded to each other. Since the zirconium plate 21 functions as a fuel cover and has good irradiation properties, the control rod 15 has high corrosion resistance. Therefore, stress corrosion cracking can be prevented from occurring in the control rod 15 though the control rod 15 contacts high-temperature water.

According to this embodiment, in the control rod 15, the composite member 22 is shaped into a cross-shaped structure, and hence, portions of the control rod 15 have low residual stress, low distortion and a long life. Therefore, the control rod 15 has high reliability and quality.

Second Embodiment

Figure 2:
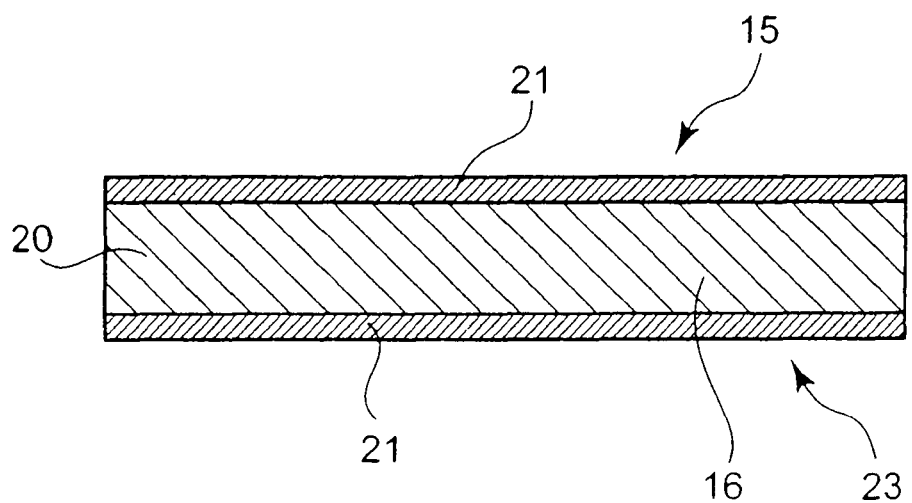
FIG. 2 is a partial sectional view of a neutron absorber included in a control rod according to a second embodiment of the present invention.

FIG. 2 is a partial sectional view of a neutron absorber 16 included in a control rod 15 according to a second embodiment of the present invention. In this embodiment, the neutron absorber 16 includes a composite member 23 including a hafnium plate 20 and zirconium plates 21 bonded to both surfaces of the hafnium plate 20 by means of hot rolling or the like as shown in FIG. 2.

The hafnium plate 20 is protected from high-temperature, high-pressure water that is a moderator, and hence, the corrosion of the neutron absorber 16 can be prevented and the creation of oxides in the control rod 15 can be suppressed. This allows the control rod 15 to have a long life.

Third Embodiment

A third embodiment of the present invention provides a method of manufacturing the control rod 15 according to the first embodiment. The control rod 15 includes the composite member 22, which includes the hafnium plate 20 and the zirconium plate 21.

Figure 3:
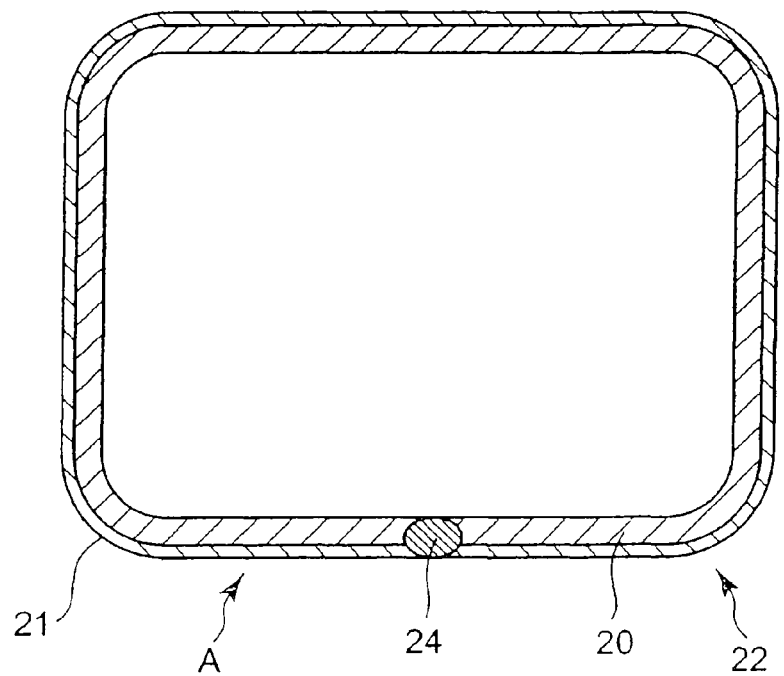
FIG. 3 is a horizontal sectional view of a composite member included in the control rod according to the first embodiment, the composite member being molded so as to have a rectangular shape, and end portions of the composite member being welded to each other.

As shown in FIG. 3, after the composite member 22, which has been prepared by bonding the hafnium plate 20 and the zirconium plate 21 together by means of rolling, for example, is shaped so as to have such a box shape that the zirconium plate 21 is located outside the hafnium plate 20, end portions of the composite member 22 are bonded to each other with a welding member 24 or the like, whereby a rectangular tube A is prepared.

Figure 4:
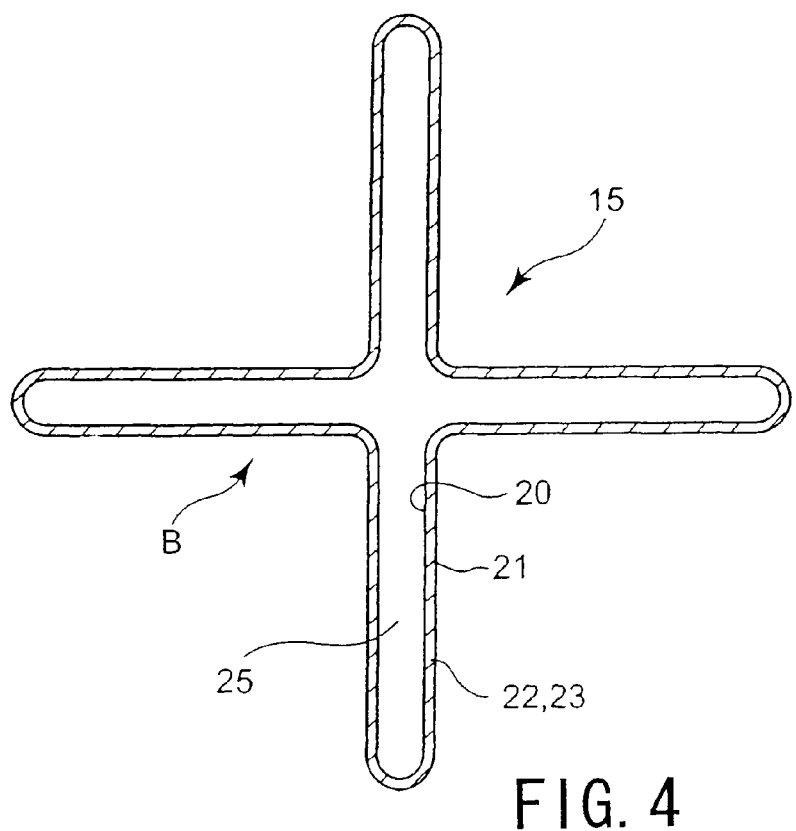
FIG. 4 is a horizontal sectional view of the composite member according to the first embodiment, the composite member being molded so as to have a rectangular shape and being further molded so as to have a cross shape.

As shown in FIG. 4, the rectangular tube A is molded into a cross-shaped tube B such that the zirconium plate 21 is located outside the hafnium plate 20. The cross-shaped tube B has an inner space 25 which has a cross shape in cross section and through which water used as a moderator can flow. As shown in FIG. 30, a front end structural member 203 including a handle 211 is welded to an upper portion of the cross-shaped tube B and a terminal end structural member is welded to a lower portion thereof, whereby the control rod 15 is obtained.

This allows cooling water used as a moderator to smoothly flow through the control rod 15. The inner space 25 contains no obstacle, and hence, no corrosive product is accumulated in the inner space 25. This allows the control rod 15 to have a long life.

Fourth Embodiment

A fourth embodiment of the present invention provides a method of manufacturing the control rod 15 according to the second embodiment. The control rod 15 includes the composite member 23, which includes the hafnium plate 20 and the zirconium plates 21 bonded to both surfaces of the hafnium plate 20. The method of this embodiment is similar to that of the third embodiment. In the control rod 15, the hafnium plate 20 is covered with the zirconium plates 21 and therefore can be prevented from being corroded. This allows the control rod 15 to have a long life.

Fifth Embodiment

Figure 5:
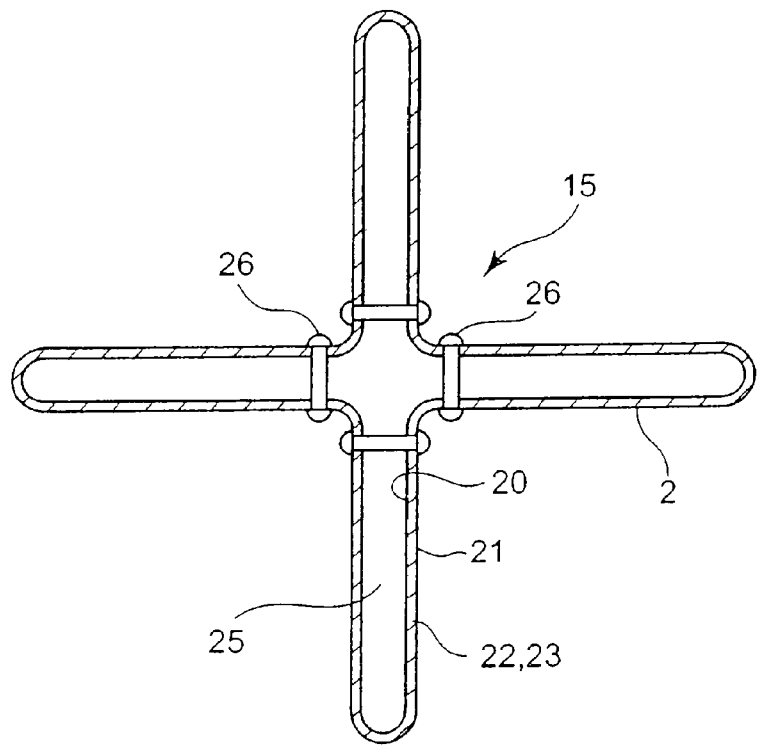
FIG. 5 is a horizontal sectional view of a control rod according to a fifth embodiment of the present invention.

FIG. 5 shows a control rod 15 according to a fifth embodiment of the present invention. The control rod 15 of this embodiment has a cross shape in cross section and includes a plurality of (four, in this embodiment) wings 2 fixed with rivets 26 that are fixing members for preventing distortion. The rivets 26 are disposed at positions which are arranged in the longitudinal direction and which are located near the base portions of the wings 2. Therefore, if the control rod 15 is used for a long time, the thickness direction of each wing 2 can be fixed by the presence of the rivets 26. This prevents the distortion of the control rod 15. If bolts are used instead of the rivets 26, the distortion of the control rod 15 can be prevented. This allows the control rod 15 to have a long life.

Sixth Embodiment

Figure 6:
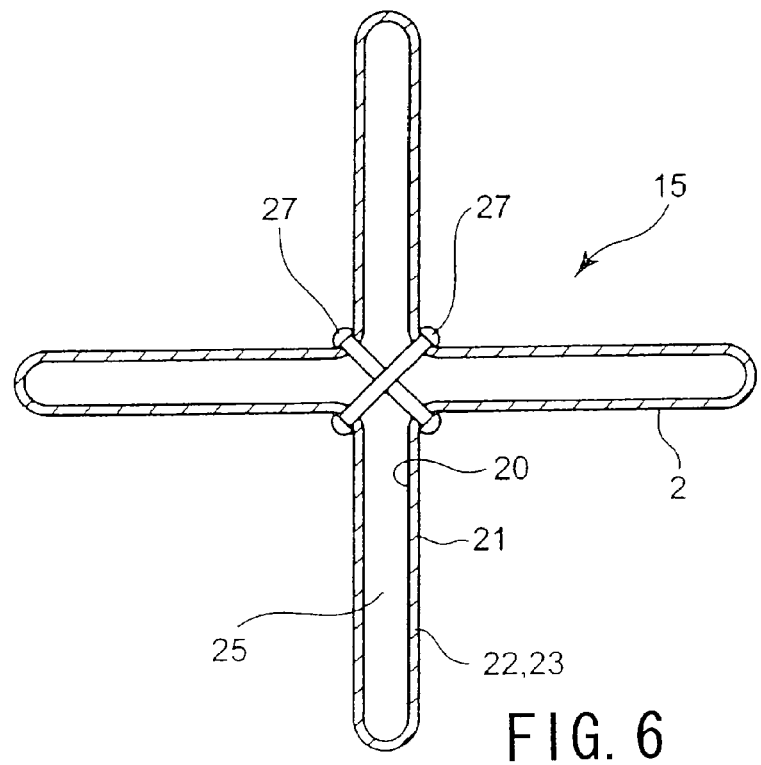
FIG. 6 is a horizontal sectional view of a control rod according to a sixth embodiment of the present invention.

A sixth embodiment of the present invention provides a method of preventing the distortion of the control rod 15 described in the third or fourth embodiment. The control rod 15 has a cross shape in cross section. With reference to FIG. 6, the control rod 15 includes wings 2 fixed with rivets 27 that are as fixing members for preventing distortion. The rivets 27 are disposed at positions which are arranged in the longitudinal direction of the control rod 15 and which are located near the base portions of the wings 2. Each rivet 27 and the longitudinal axis of each wing 2 form an angle of 45 degrees. The distortion of the control rod 15 can be prevented if the control rod 15 is used for a long time. If bolts are used instead of the rivets 27, the distortion of the control rod 15 can be prevented. This allows the control rod 15 to have a long life.

Seventh Embodiment

Figure 7:
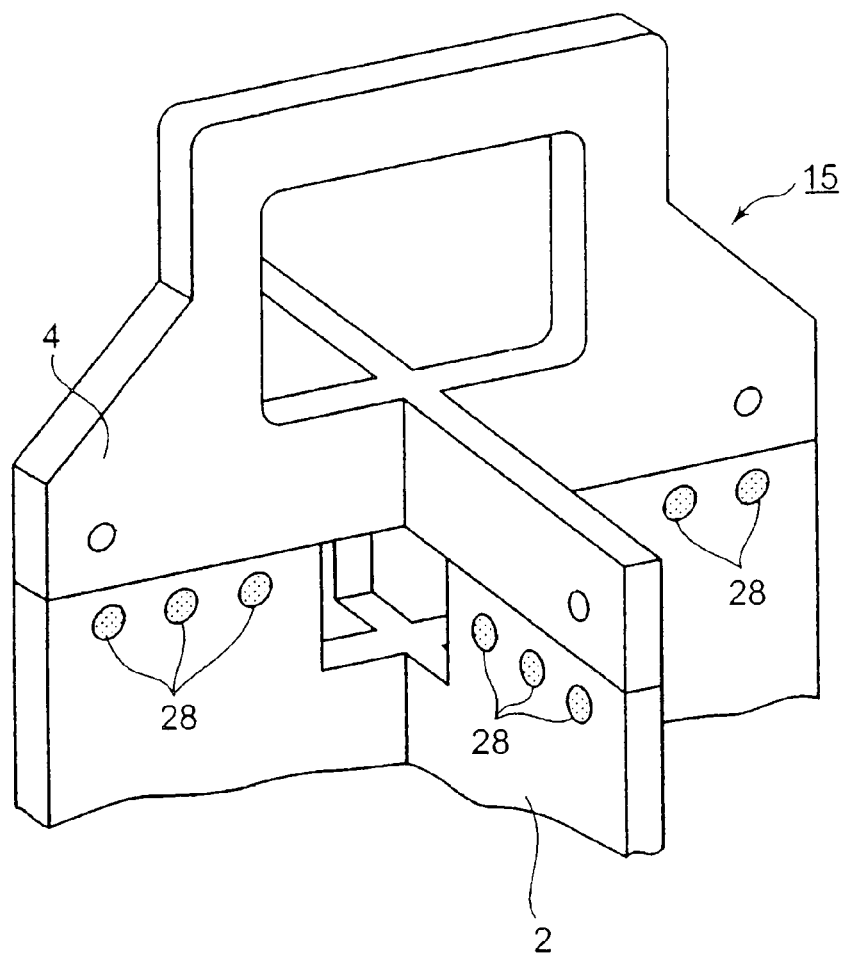
FIG. 7 is a partial cutaway perspective view of a control rod according to a seventh embodiment of the present invention.

A control rod 15 according to a seventh embodiment of the present invention is similar to that described in the third or fourth embodiment. With reference to FIG. 7, the control rod 15 includes a front end structural member 4 fixed with rivets 28 that are fixing members. Since the welding is not performed to fix the front end structural member 4, the front end structural member 4 has no residual welding stress and can be prevented from being distorted. If bolts are used instead of the rivets 28, the distortion of the control rod 15 can be prevented. This allows the control rod 15 to have a long life.

Eighth Embodiment

A control rod 15 according to an eighth embodiment of the present invention includes a front end structural member integrally molded from the hafnium-zirconium composite member 22 or 23 described in the first or second embodiment. Therefore, the control rod 15 is stable and uniform and can have a long life.

Ninth Embodiment

A control rod 15 according to a ninth embodiment of the present invention is similar to that described in the third or fourth embodiment. The control rod 15 includes a terminal end structural member fixed with rivets that are fixing members. Since the welding is not performed to fix the terminal end structural member, the terminal end structural member has no residual welding stress and can be prevented from being distorted. If bolts are used instead of the rivets, the distortion of the control rod 15 can be prevented. This allows the control rod 15 to have a long life.

As described above, the present invention of the first to ninth embodiments provides a control rod for a nuclear reactor and a method of manufacturing the same. The control rod includes a composite member including a hafnium plate functioning as a neutron absorber and a zirconium plate bonded to the hafnium plate. Therefore, the control rod can be prevented from being deteriorated and can be prevented from being corroded by high-temperature water. This allows the control rod to have high reliability and quality.

The followings are further embodiments of the control rods according to the present invention.

Beforehand the description of the further preferred embodiments, critical experiments performed for the embodiments will be described with reference to FIGS. 8 to 10.

Figure 8:
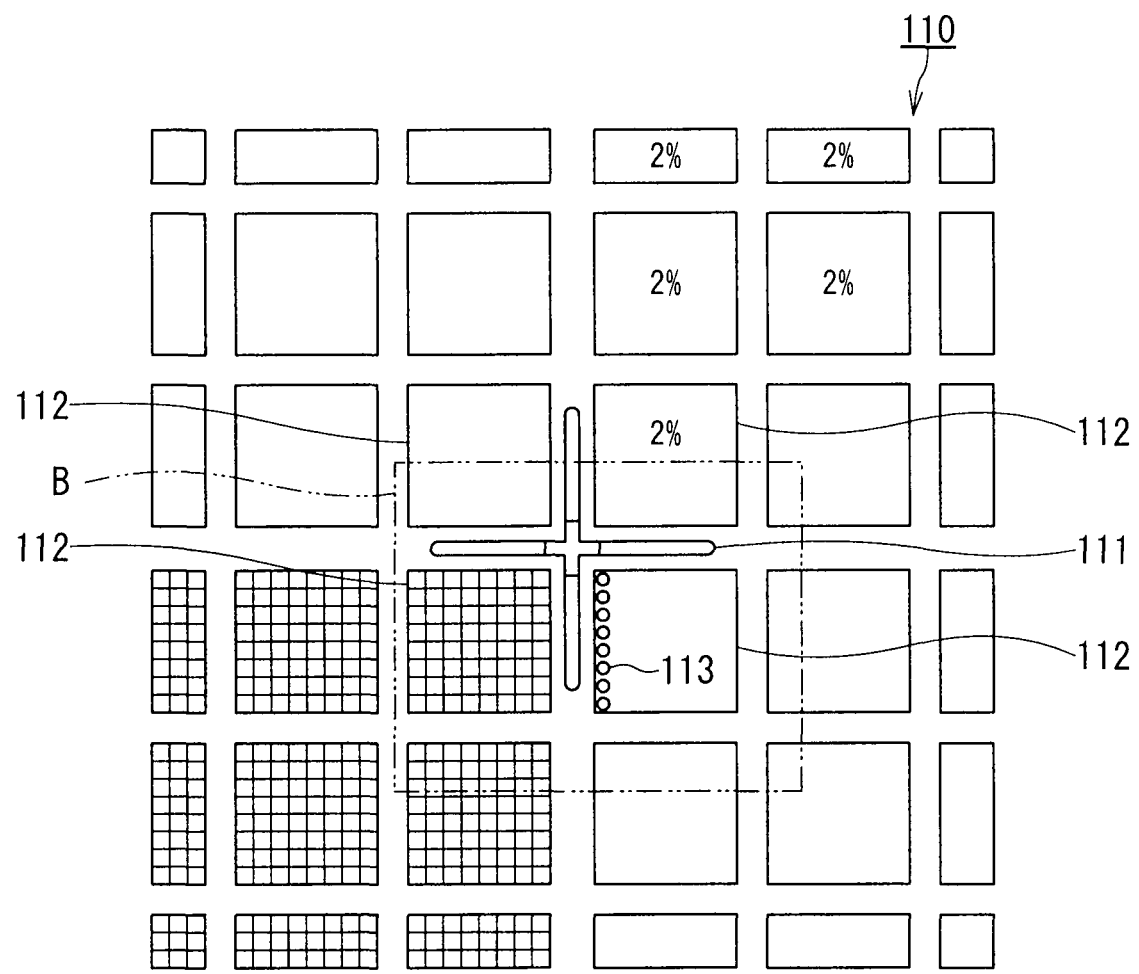
FIG. 8 is a plan view of the inside of a nuclear reactor used for experiments.
Figure 9:
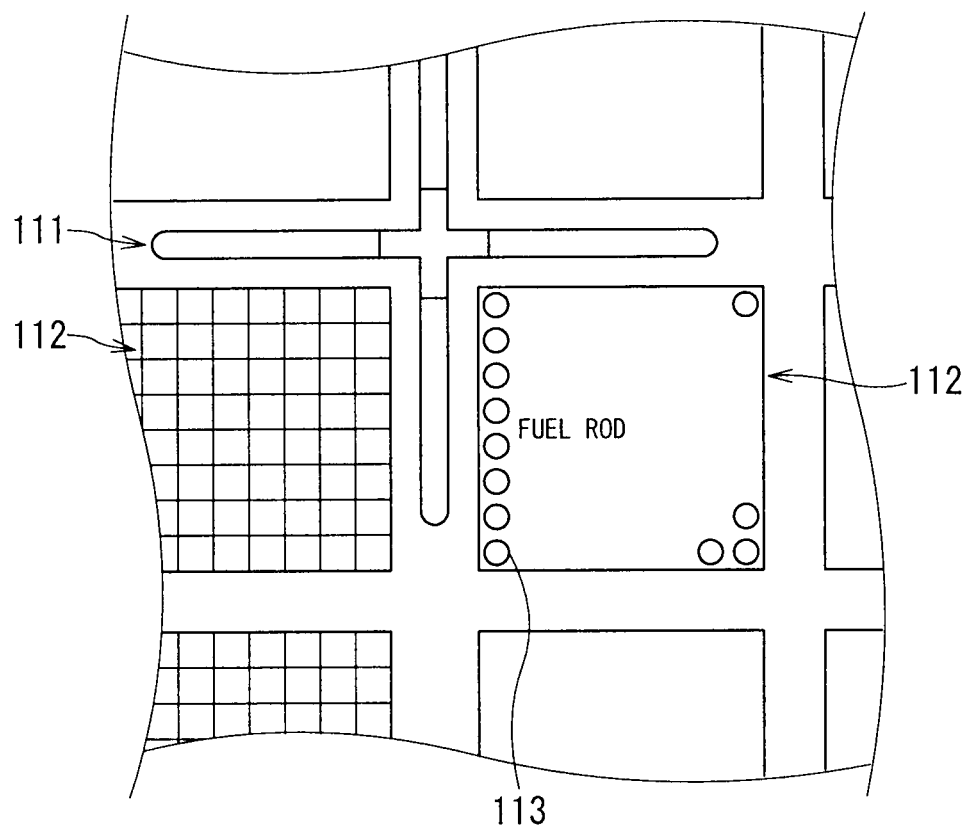
FIG. 9 is an enlarged view of a portion represented by B in FIG. 1.

FIGS. 8, 9 and 10A to 10C are illustrations showing critical experiments performed to evaluate the arrangement of neutron absorbers according to the present invention. In particular, FIG. 8 is an illustrated plan view showing an inside of a nuclear reactor used for the experiments, FIG. 9 is an enlarged view of a portion represented by B in FIG. 8, and FIGS. 10A to 10C are graphs showing the results obtained from the experiments.

In the experiments, a cross-shaped control rod 111 having the same cross section as that of an existing control rod is placed at the center of a core tank 110 of a nuclear critical assembly (NCA), and four fuel assemblies 112 different from channel boxes are arranged around the control rod 111 as shown in FIGS. 8 and 9. Furthermore, fuel rods 113 are symmetrically arranged outside the fuel assemblies 112 so as to form a square in horizontal cross section until the core of the NCA reaches a critical point.

All the fuel rods 113 have an enrichment of 2%. The control rod 111 includes neutron-absorbing rods prepared by packing podiatry boron carbide ($B_4C$) in stainless steel (SUS) tubes having an outer diameter of 4.8 mm and an inner diameter of 3.5 mm at a theoretical density of about 70% and also includes hafnium (Hf rods having substantially the same outer diameter and reactivity worth as those of the neutron-absorbing rods.

Figure 10A:
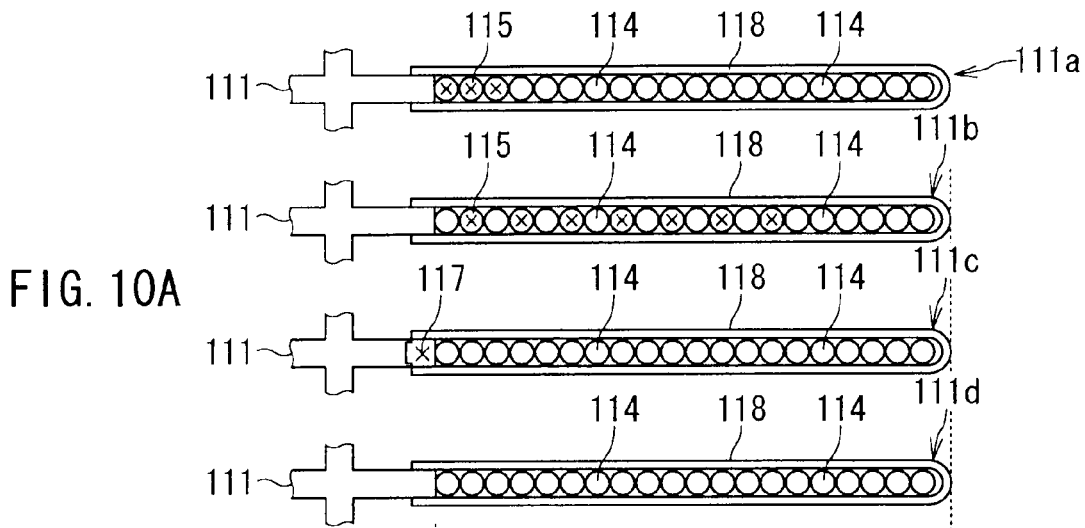
FIGS. 10A to 10C are graphs showing the results obtained from the above experiments.

A control rod 111a located in the first row in FIG. 10A includes $B_4C$-filled SUS tubes 114 and water-filled SUS tubes 115 (this configuration is hereinafter referred to as Configuration "a"), the water-filled SUS tubes 115 being marked with Symbol X. A control rod 111b located in the second row in FIG. 10A included Hf rods 116 and the water-filled SUS tubes 115 (this configuration is hereinafter referred to as Configuration "b"). A control rod 111c located in the third row in FIG. 10A includes acrylic rectangular rods 117 and the $B_4C$-filled SUS tubes 114 (this configuration is hereinafter referred to as Configuration "c"), the acrylic rectangular rods 117 being marked with Symbol X. A control rod 111d located in the fourth row in FIG. 10A includes the $B_4C$-filled SUS tubes 114 only (this configuration is hereinafter referred to as Configuration "d"). The control rods 111a to 111d includes sheaths 118, made of stainless steel, having a thickness of about 1.4 mm and a U-shape in horizontal cross section.

Figure 10B:
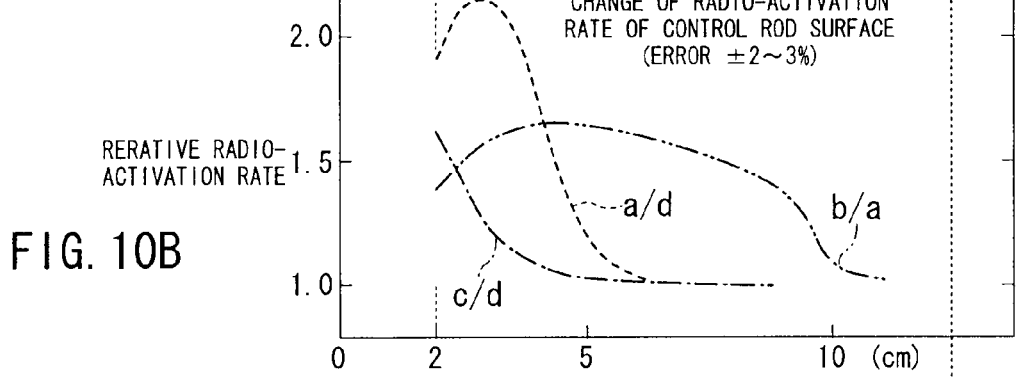

The control rod 111 includes a center member (tie rod) located at the center thereof. In the Configuration "d", a tie rod is present. In the Configuration "a", three absorbing rods which are arranged in each wing and which located on the side close to the side surface of a tie rod are replaced with three of the water-filled SUS tubes 115. In the Configuration "b", the water-filled SUS tubes 115 and the Hf rods 116 are alternately arranged in each wing so as to be located on the side close to a tie rod such that the water-filled SUS tubes 115 and the Hf rods 116 occupy two thirds of this wing. In the Configuration "c", a tie rod is removed such that a region occupied by this tie rod is filled with water. In the experiments, four types of control rods having any one of the Configurations "a" to "d" are used to measure the activation of copper foil to determine the neutron flux distribution of the surfaces of the control rods as shown in FIGS. 10B and 10C.

Strips of the copper foil are tightly attached to the sheaths 118, the core tank 110 is supplied with water, the core is made critical; and the copper foil strips are irradiated with neutrons, removed from the core tank 110, and then cut into pieces. Beta rays emitted from each piece are measured, whereby the induced radioactivity of the piece is determined.

Figure 10C:
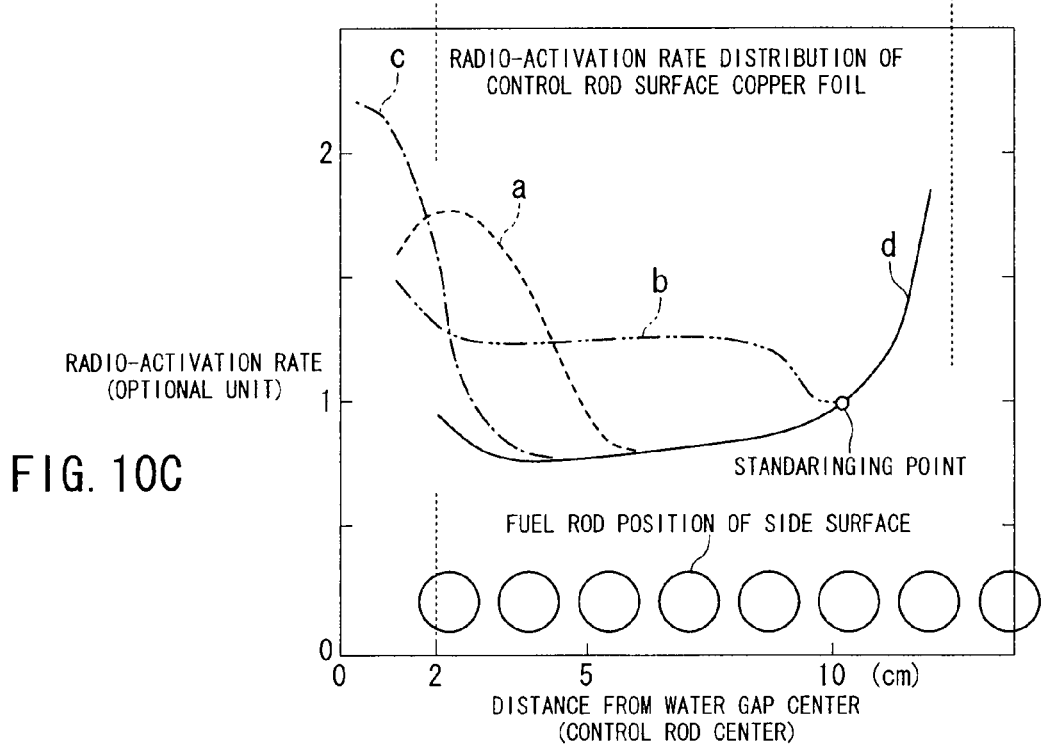

FIG. 10C shows radioactivity intensity distribution normalized with a point (a normalization point in this figure) that is hardly affected by the variation of the configuration of each control rod. FIG. 10B shows the ratio of the radioactivity intensity distribution of each configuration to that of the Configuration "a".

The activation of copper is caused by neutrons with low thermal energy, and therefore, can be assumed to be thermal neutron flux distribution. Neutron flux distribution sharply increases at an about 15-mm outer end portion of a wing.

The neutron flux of a region near the tie rod of the Configuration "d" is slightly high. The neutron flux of the Configuration "c" is very high because a region containing no tie rod occupies by water. The neutron flux of one of the fuel rods that is located near the center axis of the control rod of the Configuration "a" is very high.

The neutron flux of the Configuration "b" is high over a wide range. The power output from the fuel rods located near the control rod is not sharply varied as compared with the neutron flux distribution but similar variation is caused.

It is therefore an object of the present invention to increase a neutron flux over a wide range without greatly reducing the reactivity worth of a control rod.

As is clear from the measurement results, in the Configuration "c" having a preferable neutron flux distribution, the reactivity worth is lowest and the reduction in reactivity worth is about 8%, which is allowable. However, it is not preferable that the reactivity worth of the control rod be reduced by 8%, and hence, this configuration is used only in a necessary area. In the design of an ordinary control rod, it is unallowable that the reactivity worth of this control rod be reduced by greater than 10%.

In the Configuration "a", the reduction in reactivity worth is about 3.5%. In the Configuration "c", the reactivity worth is increased. The life and reactivity worth of the control rod can be enhanced by arranging a large number of the neutron absorbers in an end portion of each wing because the wing end portion has particularly a high neutron flux.

In an actual control rod, the end portions of the neutron absorbers arranged in each wing are irradiated with a high dose of neutrons. Therefore, when a long-life control rod is designed, long-life neutron absorbers are arranged. When a control rod with a high reactivity worth is designed, neutron absorbers with high neutron-absorbing effect are arranged. Conditions for selecting neutron absorbers arranged in a center portion of each wing are relatively easy.

Hereunder, embodiments of preferable control rods will be described on the basis of the above measurements with reference to the accompanying drawings of FIGS. 11 to 29.

Tenth Embodiment

Figure 11:
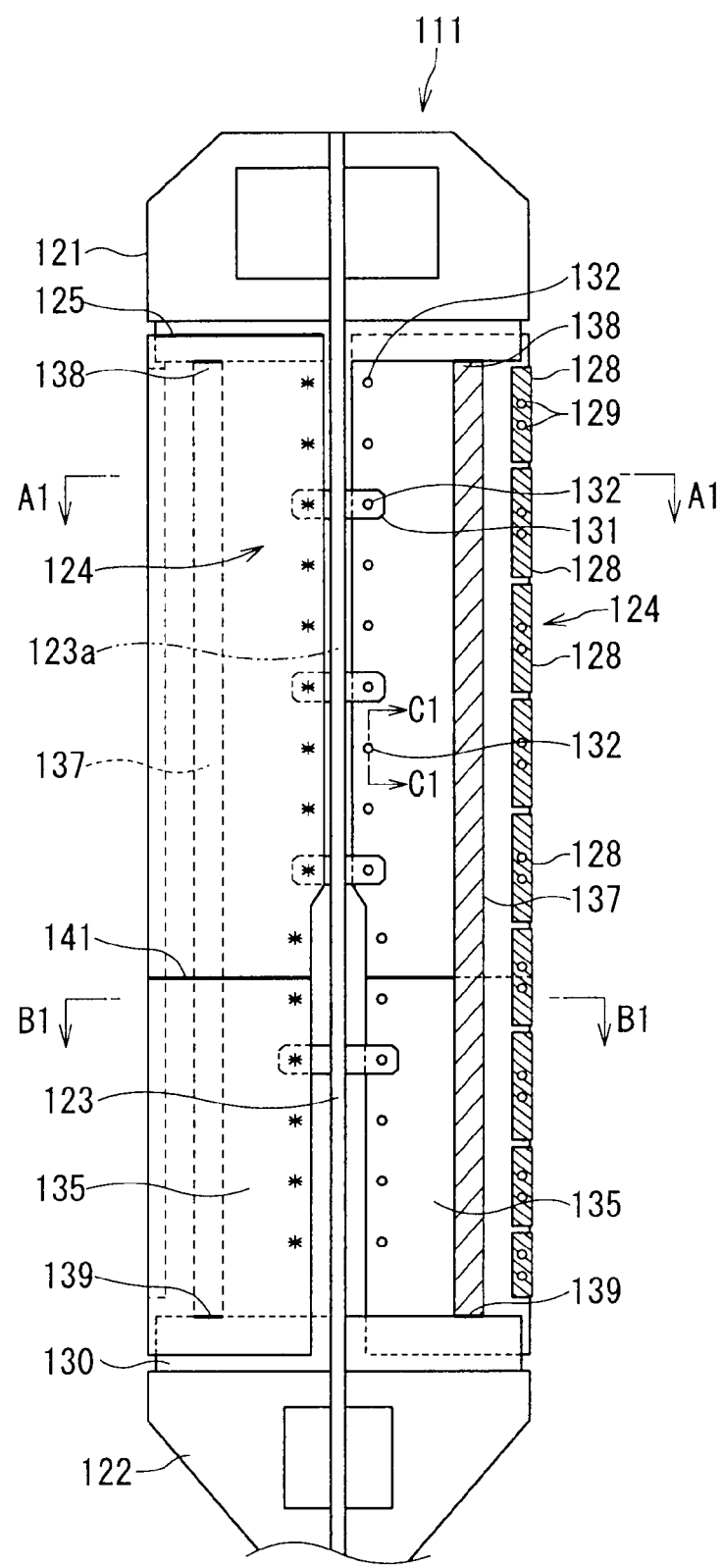
FIG. 11 is a partial sectional side view of a control rod according to a tenth embodiment of the present invention.

FIG. 11 shows a control rod 111 according to a tenth embodiment of the present invention. The right half of this figure is a sectional view of a part of the control rod 111. FIG. 12A is a sectional view of the control rod 111 taken along the line A1-A1 of FIG. 11, FIG. 12B is a sectional view of the control rod 111 taken along the line B1-B1 of FIG. 11, and FIG. 12C is a sectional view of the control rod 111 taken along the line C1-C1 of FIG. 11.

With reference to FIG. 11, the control rod 111 includes a front end structural member 121, located on the control rod insertion side (the upper side in this figure), having a cross shape in horizontal cross section and a terminal end structural member 122, located on the tailing side that is the control rod withdrawal (removal) side (the lower side in this figure), having a cross shape in horizontal cross section.

The front end structural member 121 and the terminal end structural member 122 are connected to each other with a long tie cross 123 serving as a wing-bonding member. The tie cross 123 includes a center shaft 123a and has a cross shape in horizontal cross section. At least the front end structural member 121 and the tie cross 123 are made of a zirconium alloy containing hafnium. The hafnium content of the zirconium alloy may be greater than or equal to that of natural compositions.

Four wings 124 are connected to the tie cross 123 so as to form a cross shape in horizontal cross section. Upper end portions of the wings 124 are engaged with a lower portion of the front end structural member 121 and fixed thereto through welding portions 125. Each wing 124 includes a pair of plates opposed to each other. The plates sandwich each bracket portion of the tie cross 123. The wing 124 has a principal portion including neutron absorbing plates having neutron absorbing portions made of a hafnium-zirconium alloy diluted with hafnium or zirconium. The wing 124 is narrow and tabular and has an edge section, opposed to the tie cross 123, having a narrow lower portion.

The wing 124 has a lower end portion which is engaged with an upper end portion of the terminal end structural member 122 with a gap 130, located therebetween, having a predetermined size and which is supported with the upper end portion thereof so as to be horizontally slidable. This allows the wing 124 to be expanded or shrunk due to irradiation growth or the like during fuel burning. The front end structural member 121 and the terminal end structural member 122 each include four brackets connected to the wings 124.

A plurality of short hafnium rods 128, functioning as wing end reinforcing members, are vertically arranged in a side end portion of each wing 124 with spaces, located therebetween, for absorbing thermal expansion. The hafnium rods 128 are fixed to the wing 124 with pins 129 and can vertically slide together with the wing 124 when the wing 124 is expanded or shrunk.

The wing 124 has end portions located on the tie cross side. The end portions of the wing 124 sandwich tabular portions 131, vertically arranged, extending from each bracket of the tie cross 123 and are fixed to the tabular portions 131 with pins 132. FIG. 11 shows one welding line 141 formed by welding an upper portion and lower portion of the wing 124 together (an actual control rod has a plurality of welding lines).

FIG. 12A shows an upper portion of the control rod 111 in cross section taken along the line A1-A1 of FIG. 11. FIG. 12B shows a lower portion of the control rod 111 in cross section taken along the line B1-B1 of FIG. 11. The two opposed plates included in the wing 124 are neutron absorbing plates 135 each including a composite member including a zircaloy sheet 133 and a hafnium sheet 134 bonded to the zircaloy sheet 133 by means of hot rolling or the like. The zircaloy sheet 133 is located outside the hafnium sheet 134. The neutron absorbing plates 135 are opposed to each other with a trap space 136 therebetween and have substantially a uniform thickness in the axial direction of the control rod 111.

A tie rod 137 extends in the wing 124, which includes the neutron absorbing plates 135. The tie rod 137 functions as a connecting rod for connecting the front end structural member 121 to the terminal end structural member 122 and has welding portions 138 and 139 bonded to the front end structural member 121 and the terminal end structural member 122.

With reference to FIG. 10C, one of the pins 132 is bonded to the zircaloy sheets 133 and the hafnium sheets 134 with welding portions located therebetween.

The neutron absorbing plates 135 are mounted in the wing 124 so as to be slidable from the leading end toward the tailing end of the wing 124 or from the tailing end toward the leading end of the wing 124. The hafnium rods 128 are arranged in the trap space 136 between the neutron absorbing plates 135 in the axial direction of the control rod 111. The front end structural member 121 and the terminal end structural member 122 are fixed to each other with the tie rod 137. That is, in this embodiment, the front end structural member 121 and the terminal end structural member 122 are not fixed to each other with an intersection (center shaft) of the four wings 124 but are fixed to each other using the trap spaces 136 in the wings 124 without using a conventional tie rod (center member).

A primary function of the tie rod 137, as well as that of the conventional tie rod, is to maintain the mechanical strength. The tie rod 137 is located at a position different from that of the conventional tie rod. This is because the a configuration similar to the Configuration "c" shown in FIG. 10C is obtained such that the burning of fuel rods located near the control rod 111 is prevented from being delayed during the insertion of the control rod 111 by preventing the reduction of a thermal neutron flux near the center shaft 123a.

Since the tie rods 137 are disposed in the wings 124, water is removed from a zone occupied by each tie rod 137, and hence, the neutrons are moderated, and therefore, the absorption of the neutrons is reduced. This provides a neutron absorber removal effect similar to that obtained from the Configuration "b". That is, an advantage due to the Configuration "c" can be obtained, as well as an advantage due to the Configuration "b". The Configurations "b" and "c" are effective in preventing the burning of the fuel rods located near the control rod 111 from being delayed. This effect depends on design conditions such as the size and positions of the tie rods 137 in the wings 124.

In this embodiment, each wing 124 includes the neutron absorbing plates 135, which are opposed to each other and which include the composite members including the zircaloy sheets 133 and the hafnium sheets 134. The zircaloy sheets 133 have a thickness of about 0.2 to 0.5 mm and are each located at an outer surface (a fuel assembly-side surface) of one of the wings 124. The composite members have a thickness of about 2 to 2.5 mm. The wings 124 are retained with the hafnium rods 128, the tie cross 123, and the pins 132. The hafnium rods 128 have a wing end spacer function, a reinforcing function, and a neutron-absorbing function and function as wing end-reinforcing members. The tie cross 123 is a member for bonding portions of the wings 124 located on the center shaft side. The pins 132 are members for preventing the wings 24 from being opened. Principal portions of the wings 124 are the composite members.

The tie cross 123 retains the front end structural member 121 and the terminal end structural member 122 and also retains the four wings 124 such that the wings 124 form a cross shape. The pins 132 are located at positions where the tie cross 123 is not present so as to prevent the wings 124 from being opened.

In this embodiment, the thickness of each neutron absorbing plate 135 is uniform in the axial direction of the control rod 111. It is known that the bending resistance of a plate is proportional to the cube of the thickness of the plate and proportional to the square of the width thereof, the leading half of a neutron-absorbing plate preferably has a high ability to absorb neutrons, and the tailing half thereof preferably has a low ability to absorb neutrons.

Conventional neutron-absorbing plates have thin tailing portions, which have low strength. In this embodiment, however, the neutron absorbing plates 135 have a uniform thickness as described above and the neutron-absorbing ability of the neutron absorbing plates 135 is adjusted by varying the width of tailing portions of the neutron absorbing plates 135. The insertion or withdrawal of the control rod 111 is interrupted if the side end of a leading portion of each wing 124 is not aligned with that of a tailing portion of the wing 124. Hence, the portions located on the center shaft side are removed from the neutron absorbing plates 135, which provides the effect of preventing the reduction of a thermal neutron flux as described with reference to FIG. 10. Therefore, the sharp increase of the output can be prevented during the removal of the control rod 111, thereby improving fuel health (improving the blade history phenomenon).

According to this embodiment, the control rod 111 has increased mechanical strength, and therefore, the fuel health can be improved.

In this embodiment, the neutron absorbing plates 135 are uniform in thickness, and therefore, the type of the neutron absorbing plates 135 is single. Hence, the neutron absorbing plates 135 can be manufactured at low cost. The tie rod 137 is also uniform in thickness, and hence, the tie rod 137 has good sliding properties and can be manufactured at low cost. The sliding performance of the tie rod 137 relates to the absorption of a difference in the thermal expansion and a difference in the irradiation growth.

Each neutron absorbing plate 135 may be manufactured from a single material and a portion located on the center shaft 123a may be then removed from the tailing portion of the neutron absorbing plate 135. Alternatively, the leading and tailing portions of the neutron absorbing plate 135 may be separately manufactured and then welded to each other. In the case where the leading and tailing portions thereof are welded to each other, the health of the welding portion can be improved in such a manner that the welding portion is set a position shifted from the center of the neutron absorbing plate 135 toward the tailing end thereof such that the neutron irradiation dose of the welding portion is reduced, because the neutron irradiation dose of a portion located below the center of the neutron absorbing plate 135 is significantly less than that of a center portion of the neutron absorbing plate 135.

In the neutron absorbing plate 135, the outer surface of the hafnium sheet 134 is covered with the zircaloy sheet 133 and the inner surface thereof is polished so as to provide less irregularity and a reduced area. In view of manufacture, both surfaces of the hafnium sheet 134 are preferably covered in some cases. This, however, reduces the trap space 136 in each wing 124 and causes the following disadvantages of a reduction in the reactivity worth of the control rod 111, a reduction in the diameter of the tie cross 123, and the like.

The purpose of covering both surfaces of the hafnium sheet 134 and reducing the surface area of the hafnium sheets 134 is to suppress or prevent the hafnium sheet 134 from corroding during the long-term use of the control rod 111 in a nuclear reactor. Products of the corrosion of the hafnium sheet 134 are radioactive and therefore need to be suppressed from being generated. On the other hand, products of the corrosion of the zircaloy sheet 133 are very slightly radioactive.

Although the hafnium sheet 134 has high corrosion resistance, corrosion products are generated on the hafnium sheet 134 while the hafnium sheet 134 is being used in high-temperature water for a long time. It has been known that the corrosion products fall away from the hafnium sheet 134 because of some causes. The corrosion products are radioactive. A principal nuclide in the corrosion products is $Hf^{181}$, which has a half-life of 43 days and emits gamma-rays with relatively low energy (482, 346, or 133 keV). A slight amount of $Ta^{182}$, which has a half-life of 111 days and emits a 1.2 MeV gamma-ray, is produced.

The water quality of the current BWR is greatly improved as compared to that of the conventional BWR. Since the radioactivity of the water in the current BWR is extremely low, the low radioactivity of $Hf^{181}$ can be measured. Although the environmental damage caused by $Hf^{181}$ has not been confirmed because the half-life thereof is relatively short, it has become clear that the radioactivity in nuclear reactor buildings needs to be reduced. Therefore, in this embodiment, the outer surface of the hafnium sheet 134 is covered with the zircaloy sheet 133 and the inner surface thereof is polished so as to provide less irregularity.

Outer surfaces of the control rod 111 are rubbed with zircaloy channel boxes of the fuel assemblies opposed to the control rod 111 because of the movement of the control rod 111, so that the corrosion products may fall away from the outer surfaces thereof. Therefore, the zircaloy sheets 133 are located at the outer surfaces thereof. The corrosion products present on the inner surfaces of the hafnium sheets 134 may fall away due to the impact caused by scrum, earthquake or the like to contaminate the cooling water in a nuclear reactor through water channels. Hence, the inner surfaces thereof are polished.

The zircaloy sheets 133 and the hafnium sheets 134 are manufactured by processes different from those of manufacturing the neutron absorbing plates 135, the tie rods 137 and the hafnium rods 128 because of characteristics of crystal grains in the zircaloy sheets 133 and the hafnium sheets 134, and therefore, are different in irradiation growth from the neutron absorbing plates 135, the tie rods 137 and the hafnium rods 128. An increase in irradiation dose may exert a negative influence on the health of the control rod 111. In this embodiment, various measures are taken against the negative influence.

In particular, the wings 124 and the tie rods 137 are slidable. The leading portions of wings 124 are fixed to the front end structural member 121 by welding (another technique such as pinning may be used) and the tailing portions thereof slidably sandwich the thin portions of the terminal end structural member 122. The hafnium rods 128 are short and center portions thereof are pinned with the pins 129. The hafnium rods 128 are fixed to the neutron absorbing plates 135 with the pins 129 and the upper and lower end portions of the hafnium rods 128 can be freely expanded or shrunk.

The tie cross 123 and the pins 132 located on the center shaft 123a side are short, and therefore, have no problem due to the expansion or shrinkage of the wings. If slight differences are caused by the expansion or shrinkage of the wings 124, a problem caused by the slight differences can be solved in such a way that small clearances are formed or rotatability is employed.

The wings 124 and the tie rods 137 may slide from the terminal end structural member 122 toward the front end structural member 121 or may longitudinally expand or contract. The wings 124 may include U-shaped composite absorbing plates instead of the hafnium rods 128.

Eleventh Embodiment

Figures 13A, 13B, 13C, 13D:
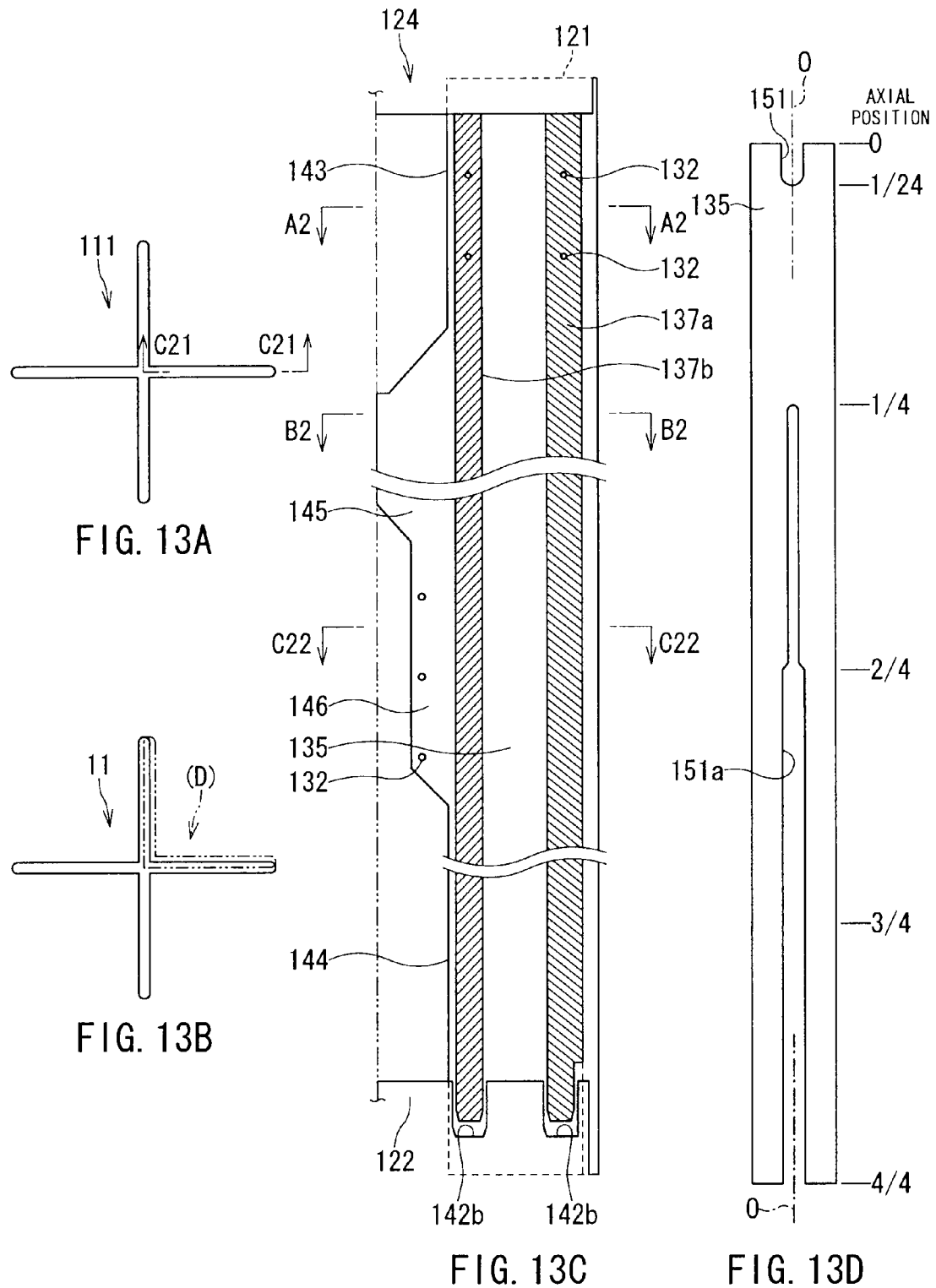
FIGS. 13A and 13B are plan views of a control rod according to an eleventh embodiment of the present invention.
FIG. 13C is a sectional view of the control rod taken along the line C21-C21 of FIG. 13A.
FIG. 13D is a side view of one of neutron-absorbing plates each used to form one wing.
Figure 14A:
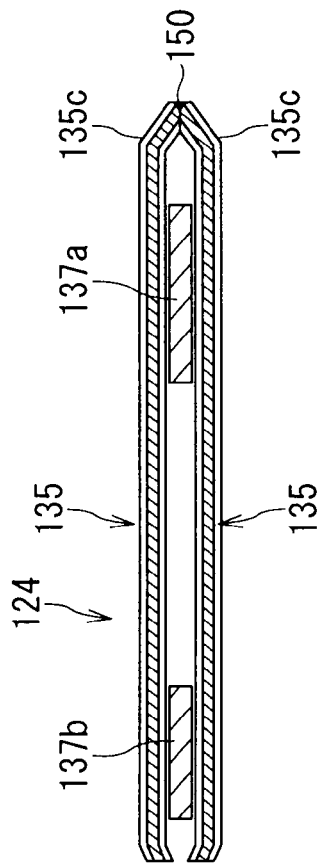
FIGS. 14A, 14B and 14C are sectional views of the neutron-absorbing plate taken along the line A2-A2, the line B2-B2 and the line C22-C22, respectively, of FIG. 13C.
Figure 14B:
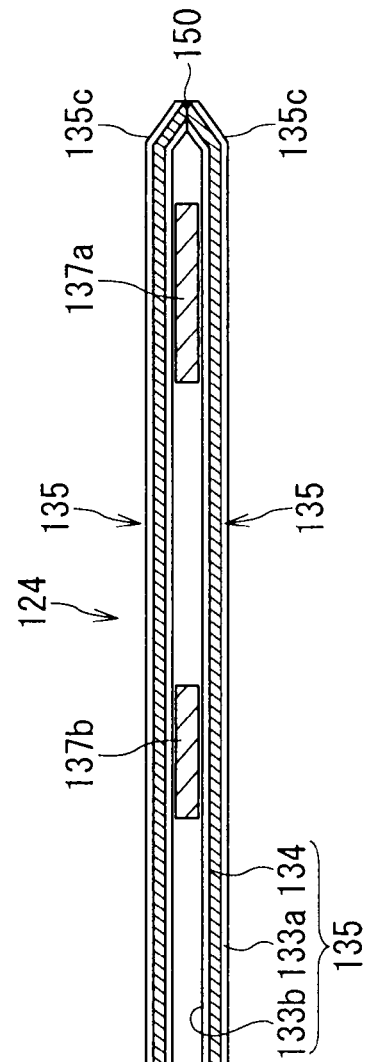
Figure 14C:
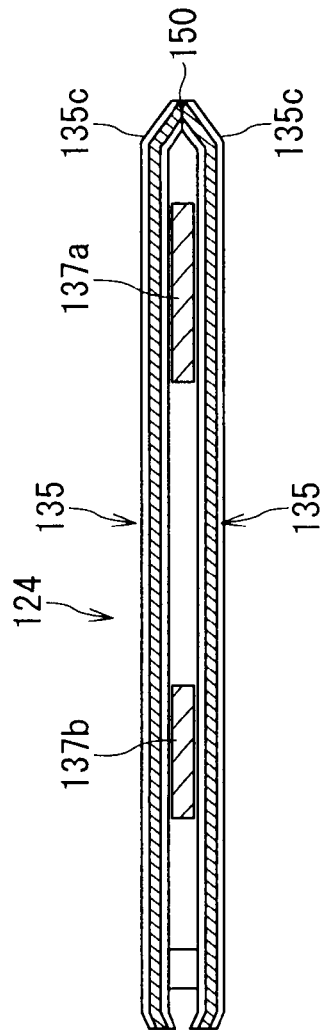

FIG. 13A is a plan view of a control rod 111 according to an eleventh embodiment of the present invention. FIG. 13B is another plan view of the control rod 111. FIG. 13C is a sectional view of the control rod 111 taken along the line C21-C21 of FIG. 13A. FIG. 13D is a side view of one of neutron absorbing plates 135 each used to form one wing. FIG. 14A is a sectional view of the neutron absorbing plate 135 taken along the line A2-A2 of FIG. 13C. FIG. 14B a sectional view of the neutron absorbing plate 135 taken along the line B2-B2 of FIG. 13C. FIG. 14C is a sectional view of the neutron absorbing plate 135 taken along the line C22-C22 of FIG. 13C.

In this embodiment, the neutron absorbing plate (composite absorbing plate) 135 includes a first zircaloy sheet 133a, a second zircaloy sheet 133b, and a hafnium sheet 134 sandwiched therebetween. The same components as those described in the tenth embodiment will not be described herein in detail.

With reference to FIGS. 13A and 13B, the control rod 111 has a cross shape in a plan view and includes wings 124. With reference to FIG. 13C, a first tie rod 137a and a second tie rod 137b extend through each wing 124.

The leading end of the wing 124 is fixed to a front end structural member 121. The wing 124 has a small clearance located near the leading end of the neutron absorbing plate 135 and pinned with pins 132. A tailing portion of the first tie rod 137a and a tailing portion of the second tie rod 137b are fitted in a first recess 142a and second recess 142b, respectively, disposed in a thin portion of a terminal end structural member 122, the thin portion being sandwiched between portions of the wing 124. The tailing portions of the first and second tie rods 137a and 137b can slide such that differences in the irradiation growth between the wing 124 and the first and second tie rods 137a and 137b can be absorbed.

The first tie rod 137a is located on the wing tip side and is made of hafnium so as to have high neutron absorbing properties. The second tie rod 137b is located near the center axis and is made of zirconium such that the neutron-absorbing effect due to the removal of water is slightly suppressed.

As shown in FIG. 13D, the neutron absorbing plate 135 is bent along dashed line O so as to have substantially an L-shape in a plan view. The bent neutron absorbing plate 135 forms surfaces of the two adjacent wings 124 as indicated by imaginary line (D) in FIG. 13B (that is, four of the neutron absorbing plates 135 form outer surfaces of the control rod 111).

One of the wings 124 made from the neutron absorbing plates 135 has a closed configuration in which end portions 135C of two of the neutron absorbing plates 135 are bent so as to oppose to each other and fixed to each other with a welding portion 150 as shown in FIGS. 14A, 14B, and 14C.

As shown in FIG. 13C, each neutron absorbing plate 135 has a first portion 143, a second portion 144, a third portion 145 and a fourth portion 146. The first portion 143 extends from the leading end of the neutron absorbing plate 135 and has a length equal to one 24th (1/24) of the length of the neutron absorbing plate 135 (it is known that no problem occurs if the reactivity worth is reduced to a certain extent, because the length of the first portion 143 is about 15 to 16 cm). The second portion 144 extends from the tailing end of the neutron absorbing plate 135, has a length equal to one half (1/2) of the length of the neutron absorbing plate 135 and is relatively greatly recessed from the center axis to have a small width. The third portion 145 extends from the first portion 143, has a length equal to the difference obtained by subtracting the length of the first portion from one fourth (1/4) of the length of the neutron absorbing plate 135 and is not recessed because the third portion 145 is the most important in reactivity worth. The fourth portion 146 extends from the fourth portion 145 to the second portion 144 and is slightly recessed because the fourth portion 146 needs to have a good balance between reactivity worth and measures against blade history.

The whole of the neutron absorbing plate 135 is shown in FIG. 13D. The neutron absorbing plate 135 has an upper notch 151, located at the leading end thereof (the upper end of FIG. 13D), having a large width and also has a lower notch 151a. The upper notch 151 corresponds to the first portion 143 shown in FIG. 13C and the lower notch 151a corresponds to the second, third and fourth portions 144, 145 and 146 shown in FIG. 13C. This configuration is used for measures against the blade history because no reactivity worth is required. A tie cross, which is not shown, is fixed to portions of the wings 124 located close to the center axis of the control rod 111.

Pins 132 functioning as members for preventing the wings 124 from being opened may be arranged as required. End portions 135c of the neutron absorbing plates 135, as well as those described in the first embodiment, are fixed to the welding portions 150 in such a state that the end portions 135c thereof are bent so that the insertion or withdrawal of the control rod 111 is not prevented. The leading ends of the wings 124 are fixed to the front end structural member 121 and the tailing ends thereof are fixed to the terminal end structural member 122.

The first tie rod 137a is located on the wing tip side and is made of hafnium so as to have high neutron-absorbing properties. The second tie rod 137b is located close to the center axis and is made of zirconium so that the neutron-absorbing effect due to the removal of water is slightly suppressed.

In this embodiment, the same advantages as those described in the tenth embodiment are obtainable. The first and second zircaloy sheets 133a and 133b have a uniform width and may have a nonuniform width depending on design conditions. This may be applied to following embodiments.

Twelfth Embodiment

Figure 15:
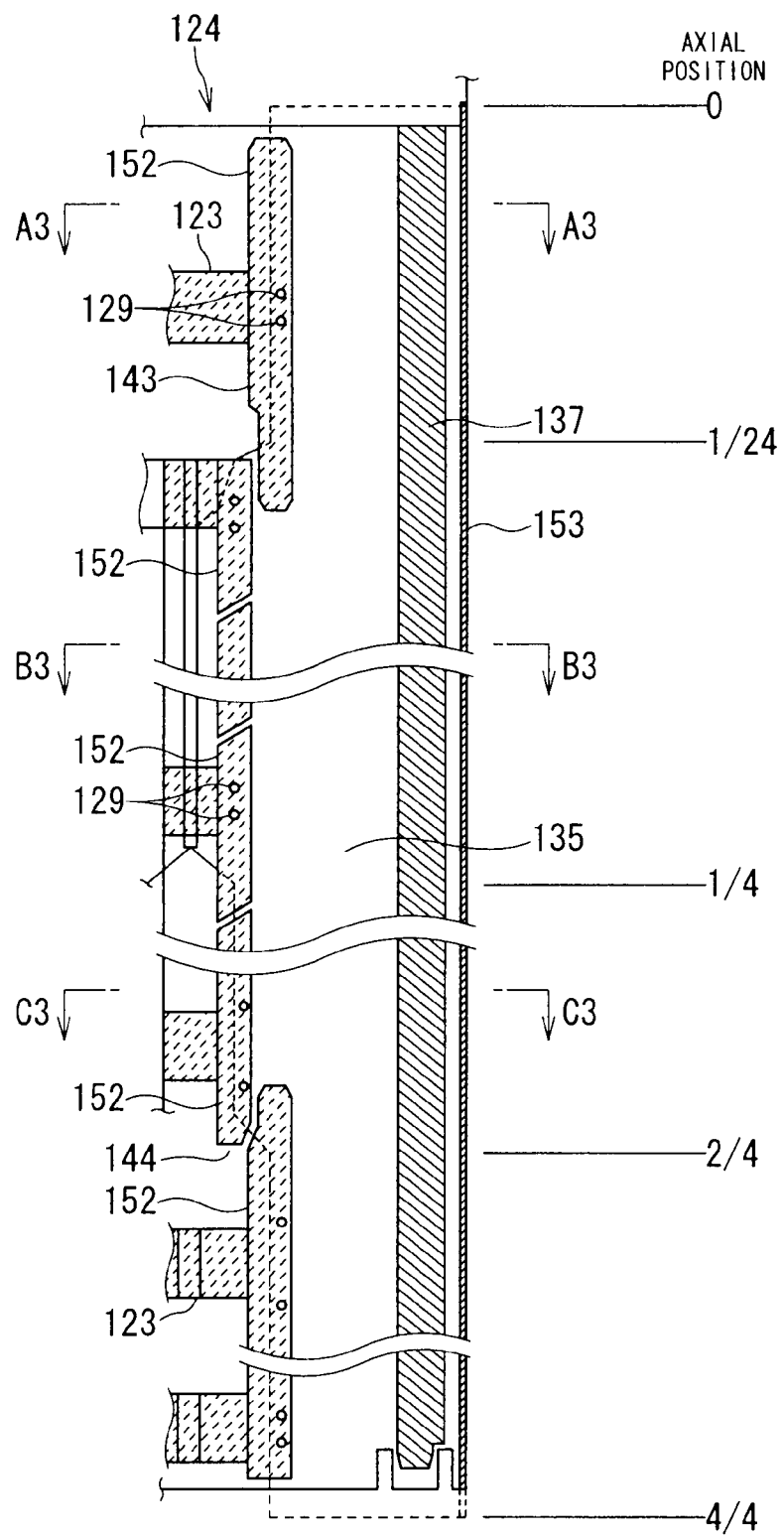
FIG. 15 is a vertical sectional view of one of wings included in a control rod according to a twelfth embodiment of the present invention.

FIG. 15 is a vertical sectional view of one of wings 124 included in a control rod according to a twelfth embodiment of the present invention. FIG. 16A is a sectional view of the wing 124 taken along the line A3-A3 of FIG. 15. FIG. 16B is a sectional view of the wing 124 taken along the line B3-B3 of FIG. 15. FIG. 16C is a sectional view of the wing 124 taken along the line C3-C3 of FIG. 15.

The control rod of this embodiment has a configuration similar to that of the eleventh embodiment have a similar configuration, but both the control rods are different from each other in that a single slidable tie rod 137 is located near the side end of the wing 124, and the wing 124 has a configuration different from that of the wings 124 in the control rod 111 of the eleventh embodiment.

With reference to FIG. 15, the wing 124 includes a neutron absorbing plate 135 as absorbing plate. The neutron absorbing plate 135 has a first portion 143, a second portion 144 and a third portion. The first portion 143 extends from the leading end of the neutron absorbing plate 135 and has a length equal to one 24th (1/24) of the length of the neutron absorbing plate 135. The second portion 144 extends from the tailing end of the neutron absorbing plate 135 and has a length equal to one half (1/2) of the length of the neutron absorbing plate 135. The first portion 143 and the second portion 144 are configured of two sheets opposed to each other. The third portion extends from the first portion 143 and has a length equal to the difference obtained by subtracting the length of the first portion from one half (1/2) of the length of the neutron absorbing plate 135. The neutron absorbing plate 135, as well as that described in the eleventh embodiment, is bent to an L-shape to form the wing 124. The outer surface of the neutron absorbing plate 135 is covered with zircaloy and the inner surface thereof is polished so as to have a reduced effective area. Therefore, the corrosion area of the neutron absorbing plate 135 can be reduced.

In this embodiment, no zircaloy coating which eliminates trap water is present on the inner surface of the neutron absorbing plate 135. This configuration is suitable for thin control rods that need to include thin wings. A plurality of short spacers 152 are located near the center axis of the control rod. Center portions of the spacers 152 are fixed to a tie cross 123 by means of pins 129.

With reference to FIGS. 16A, 16B, and 16C, the wing 124 has an outer end portion 153 bent at a relatively large angle. The outer end portion 153 is fixed to the neutron absorbing plate 135 through a welding portion 139 disposed therebetween. A portion of the wing 124 that is located near the center axis of the control rod is fixed by means of the pins 129.

The spacers 152 are made of hafnium so as to have a small weight when the reactivity worth is primarily desired. The spacers 152 are made of zircaloy when measures against blade history are primarily desired. The spacers 152 are alternately arranged in the axial direction of the control rod so as to partially overlap with each other. This is because the spacers 152 are short and the bending strength of boundaries between the spacers 152 is prevented from being reduced. In this embodiment, other components and advantages are substantially the same as those described in the tenth or eleventh embodiment.

Thirteenth Embodiment

Figure 17:
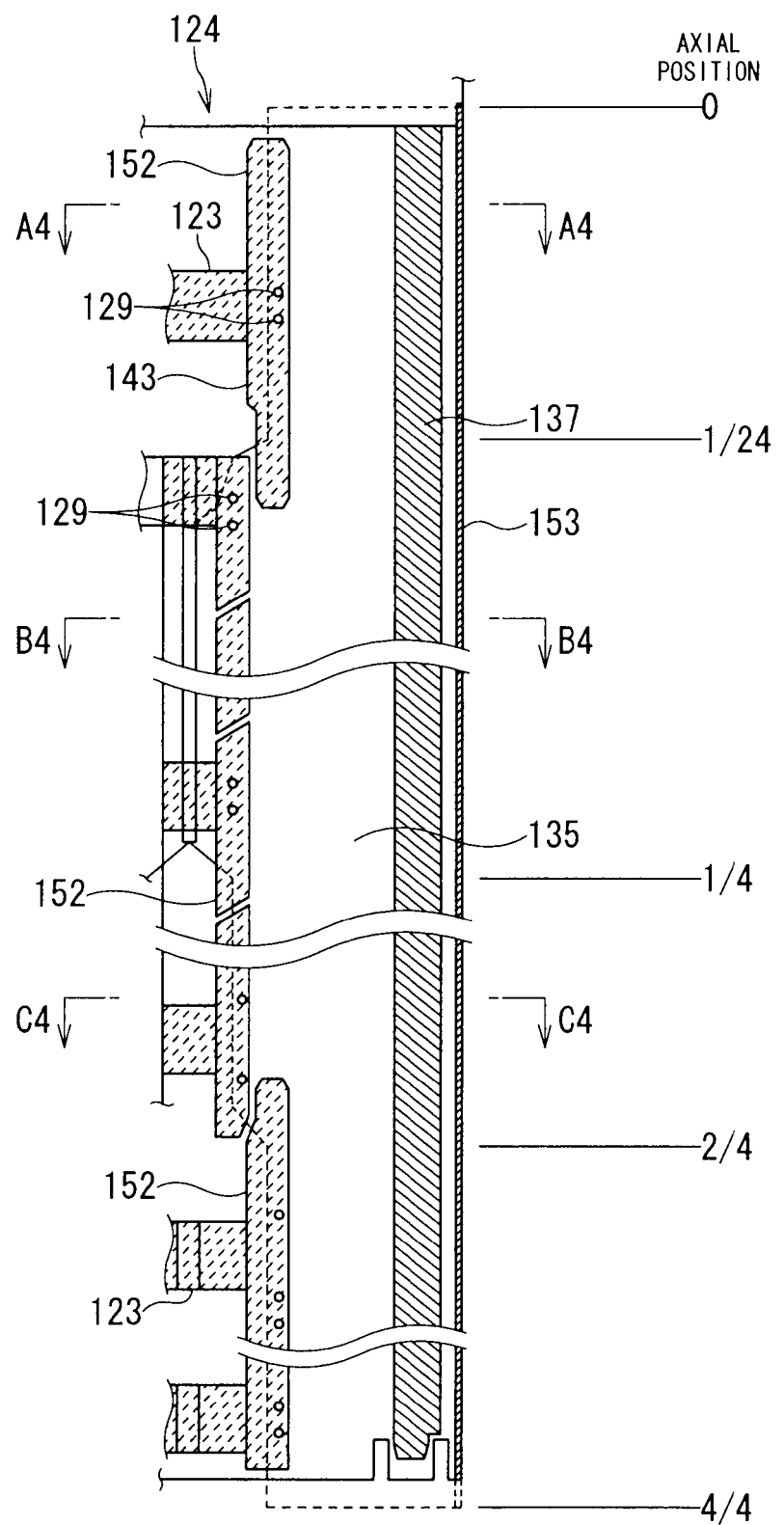
FIG. 17 is a vertical sectional view of one of wings included in a control rod according to a thirteenth embodiment of the present invention.
Figure 18A:
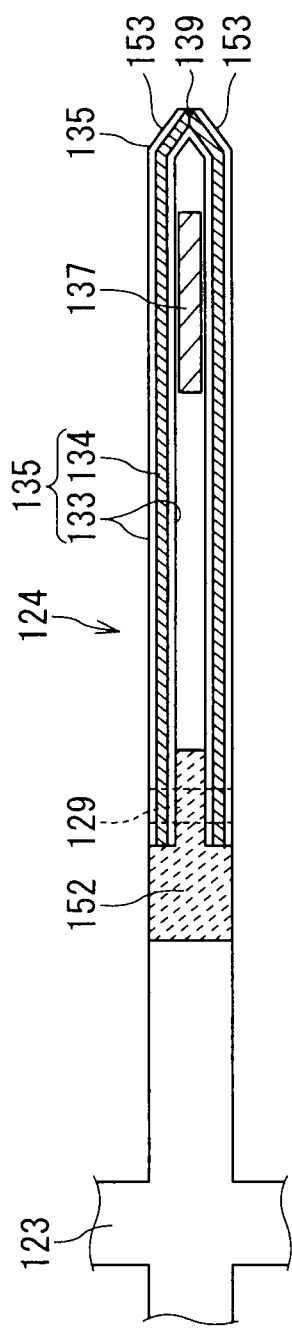
FIGS. 18A, 18B and 18C are sectional views of the wing taken along the line A4-A4, the line B4-B4 and the line C4-C4, respectively, of FIG. 17.
Figure 18B:
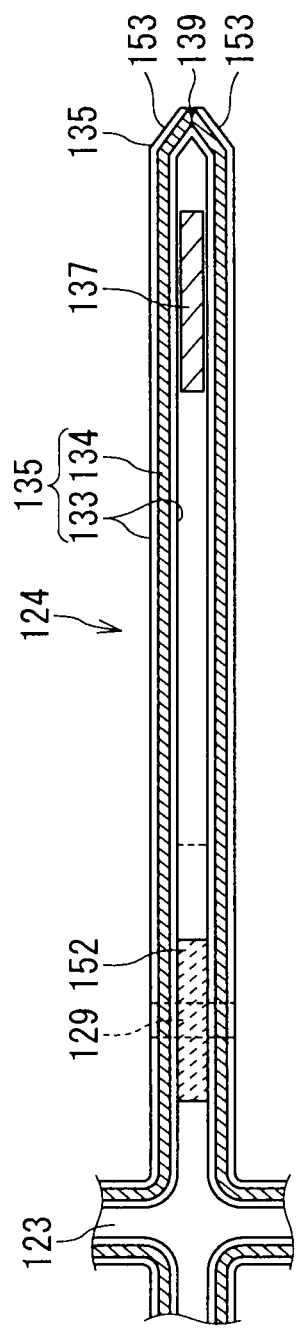
Figure 18C:
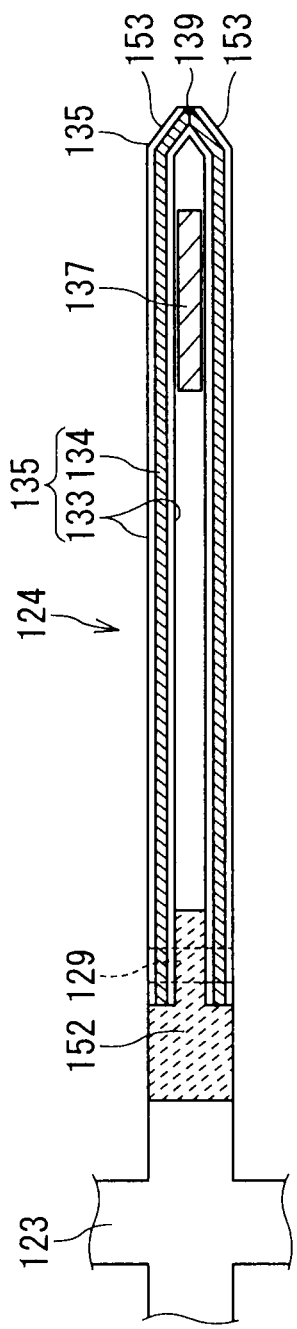

FIG. 17 is a vertical sectional view of one of wings 124 included in a control rod according to a thirteenth embodiment of the present invention. FIG. 18A is a sectional view of the wing 124 taken along the line A4-A4 of FIG. 17. FIG. 18B is a sectional view of the wing 124 taken along the line B4-B4 of FIG. 17. FIG. 18C is a sectional view of the wing 124 taken along the line C4-C4 of FIG. 17.

The control rod of this embodiment has a configuration similar to that of the control rod of the twelfth embodiment. The outer surface of the hafnium sheet included in the neutron absorbing plate 135 of the twelfth embodiment is covered with the zircaloy sheet. Each neutron absorbing plate 135 which is a composite absorbing plate and which is included in the control rod of this thirteenth embodiment includes zircaloy sheets 133 and a hafnium sheet 134 sandwiched therebetween.

The configuration of this embodiment is suitable for control rods in which trap water regions between the absorbing plates 135 can be kept within a desired range and is particularly suitable for thick control rods. Other components and advantages are substantially the same as those described in the twelfth embodiment, and therefore, will not be described.

Fourteenth Embodiment

Figure 19:
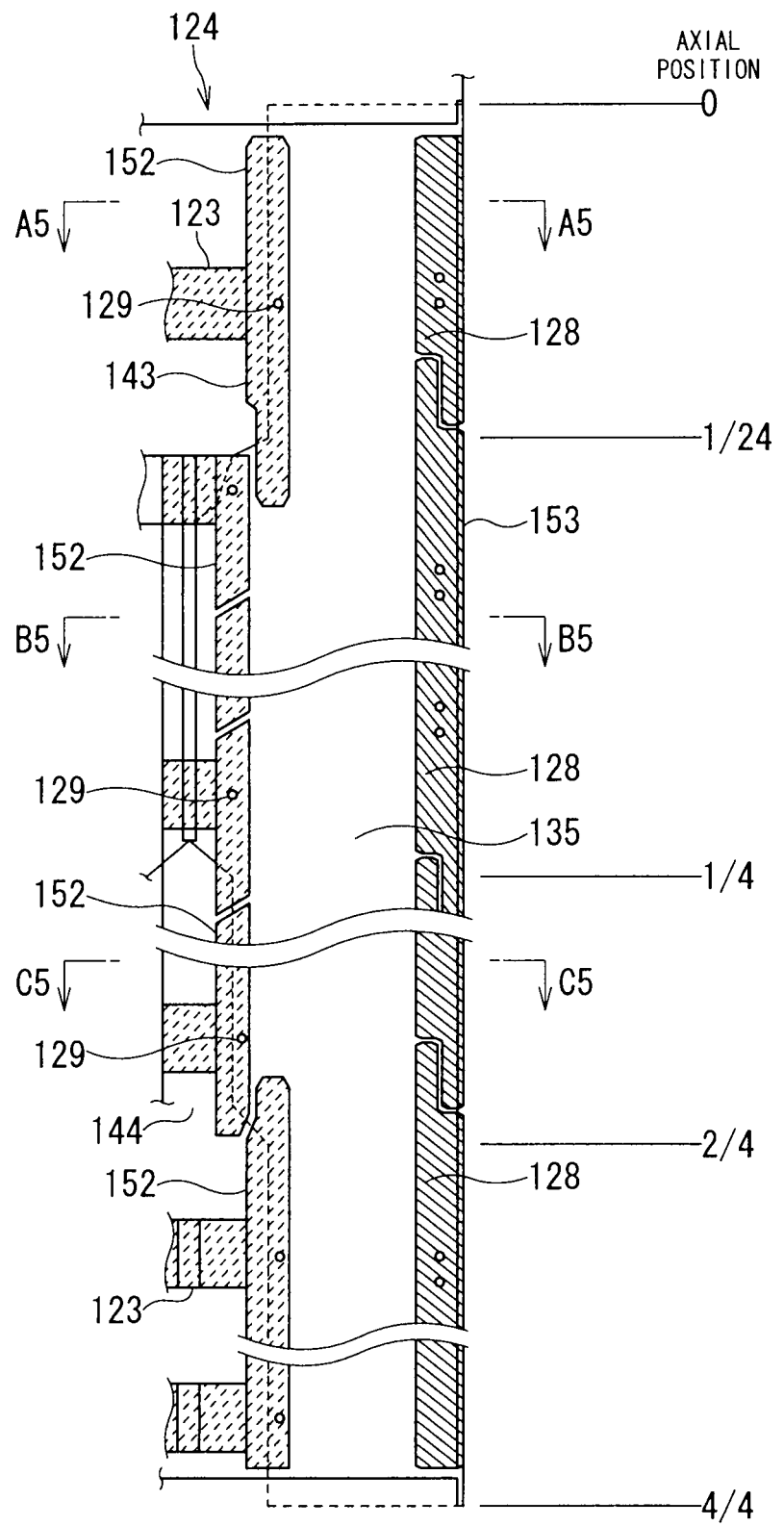
FIG. 19 is a vertical sectional view of one of wings included in a control rod according to a fourteenth embodiment of the present invention.
Figure 20A:
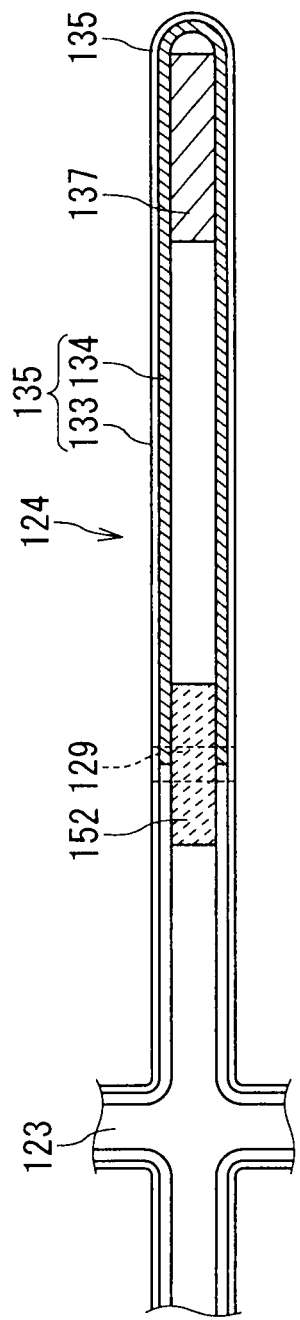
FIGS. 20A, 20B and 20C are sectional views of the wing taken along the line A5-A5, the line B5-B5 and the line C5-C5, respectively, of FIG. 19.
Figure 20B:
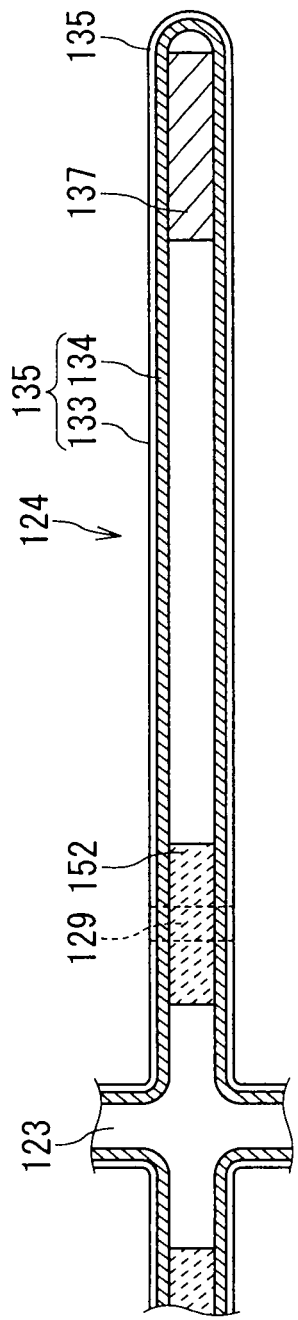
Figure 20C:
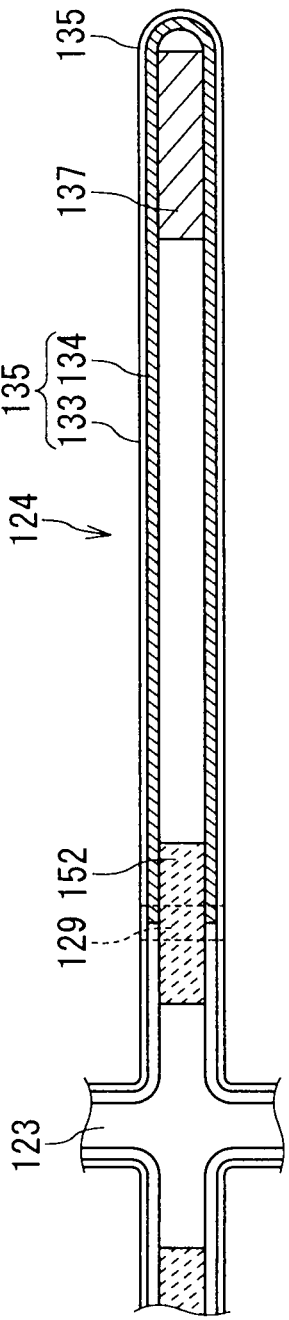

FIG. 19 is a vertical sectional view of one of wings 124 included in a control rod 111 according to a fourteenth embodiment of the present invention. FIG. 20A is a sectional view of the wing 124 taken along the line A5-A5 of FIG. 19. FIG. 20B is a sectional view of the wing 124 taken along the line B5-B5 of FIG. 19. FIG. 20C is a sectional view of the wing 124 taken along the line C5-C5 of FIG. 19.

With reference to FIG. 19, a lower end portion of the wing 124 has substantially the same size and configuration of an end portion thereof. The upper and lower end portions of the wing 124 need not have the same size and configuration and may have different sizes and configurations. The optimum sizes of the upper and lower end portions of the wing 124 may be designed.

With reference to FIGS. 19, 20A, 20B and 20C, the control rod 111 has a cross shape in cross section and there is no significant difference in configuration between the control rod 111 of this embodiment and those of the above-mentioned embodiments. Therefore, FIGS. 19, 20A, 20B and 20C will not be described herein in detail.

This embodiment focuses on a method of manufacturing the control rod 111 and measures against the blade history in view of the transverse cross-sectional structure of the control rod 111.

Figure 21:
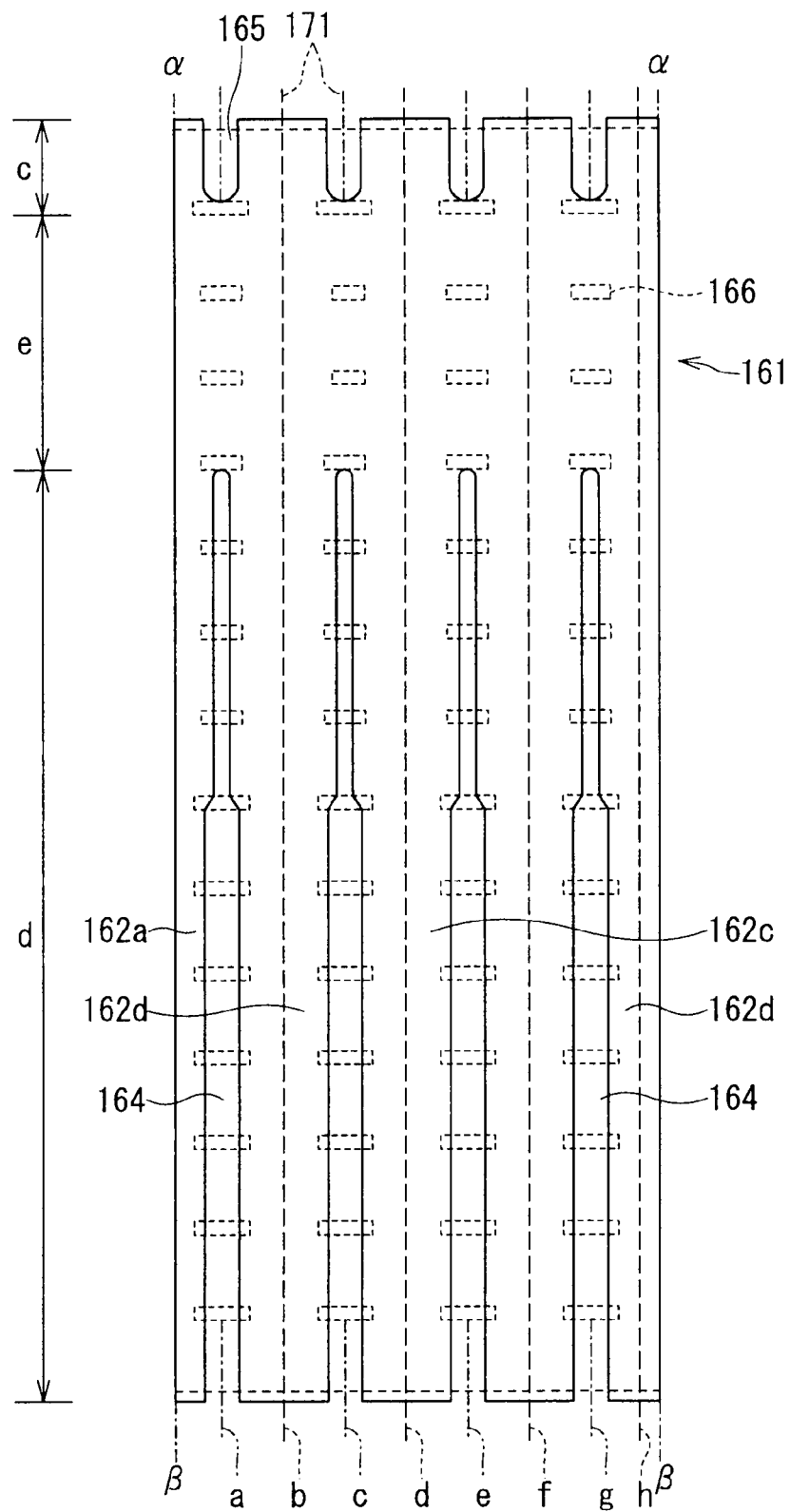
FIG. 21 is a developed view of a hafnium sheet included in the control rod according to the fourteenth embodiment.

FIG. 21 is a developed view of a hafnium sheet included in the control rod 111 and shows the configuration of a material 161, having four parts, for manufacturing the control rod 111. The material 161 is a composite absorbing plate and includes the hafnium sheet covered with zircaloy. With reference to FIG. 21, the material 161 has not been bent to a cross shape and has been punched.

The material 161 includes four composite absorbing plate elements 162a to 162d having the same shape as that of the neutron-absorbing plates 135 which are shown in FIG. 13D described with reference to the tenth embodiment and which are composite absorbing plates. The composite absorbing plate elements 162a to 162d have notches 164 and 165 having the same shape as that of notches present in the neutron absorbing plate 135 indicated by the broken line in FIG. 19. The composite absorbing plate elements 162a to 162d have folding lines 171a to 171h. The material 161 is valley-folded at a right angle along the folding lines 171a, 171c, 171e and 171g passing through the notches 164 and 165 and is mountain-folded at a right angle along the folding lines 171b, 171d, 171f and 171h passing through regions between the notches 164 and 165.

This allows the material 161 to have a wavy shape with mountain portions and valley portions. The resulting material 161 is further folded, whereby the control rod 111 having a cross shape in cross section can be formed.

With reference to FIG. 21, the leftmost and rightmost composite absorbing plate elements 162a and 162d, respectively, have different widths. This allows welding portions of the finally assembled material 161 not to be located at an end portion of one of the wings 124 but to be located at a flat portion thereof. The welding portions are welded to each other, whereby workability and strength properties can be enhanced.

Figure 22:
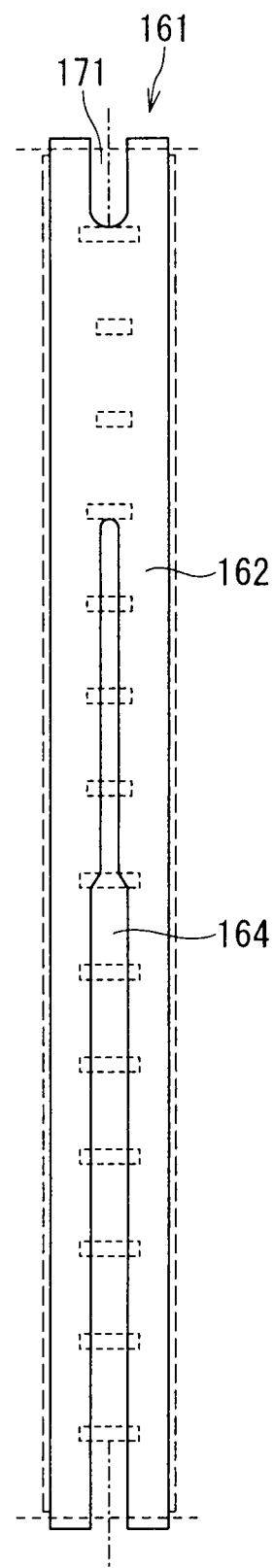
FIG. 22 is an illustration of a principal portion of the hafnium sheet shown in FIG. 21.

FIG. 22 shows a principal portion of the material 161 shown in FIG. 21. With reference to FIG. 22, the material 161, which is used to manufacture the control rod 111, has a length of about 3.6 m and a width of about 1 m. If the size of the material 161 is too large to manufacture the control rod 111, the composite absorbing plates 135 prepared by cutting the material 161 along the line connecting the center of the line α-α and that of the line β-β in FIG. 21 may be welded into one piece.

The reason why the material 161 is cut along the line connecting the center of the line a-a and that of the line β-β is to avoid the welding portions from being located at mountain- or valley-folded portions of the control rod 111 having a cross shape. The line α-β is determined on the basis of the same concept as described above.

The tailing end of a front end structural member is located at a position represented by the dotted line present in a leading end portion of the material 161 and the leading end of a terminal end structural member is located at a position represented by the dotted line present in a tailing end portion of the material 161. The material 161 has a first portion "c", a second portion "d", and a third portion "e". The first portion "c" extends from the leading end of the material 161 and has a length equal to about one 24th (1/24) of the length of the material 161. The second portion "d" extends from the first portion "c" and has a length equal to the difference obtained by subtracting the length of the first portion "c" from one fourth (1/4) of the length of the material 161. The third portion "e" extends from the tailing end of the material 161. The first portion "c" has wide notches located at the valley-folded portions. The second portion "d" has no notch. The third portion "e" has wide notches located at the valley-folded portions and also has narrow notches extending from a position apart from the leading end of the material 161 at a distance equal to one fourth (¼) of the length of the material 161 to a position apart from the leading end of the material 161 at a distance equal to two fourth (2/4) of the length of the material 161.

The above notches are eliminated from portions that need to have high reactivity worth but are arranged in portions that may have slightly low reactivity worth so that the reactivity worth and measures against blade history are balanced. This concept is consistent herein.

The need of the first portion "c" is low in view of reactivity worth during the shutdown of a nuclear reactor. The first portion "c" is not provided in the control rod 111 of the tenth embodiment because the first portion "c" is supposed to influence scrum properties at the moment of the insertion of the control rod 111 of the first embodiment when the insertion rate of the control rod 111 of the first embodiment is not large. Short rod-shaped portions 166, horizontally extending, surrounded by dotted lines show a wing-bonding member, that is, a tie cross 123 for keeping a cross shape. The wing-bonding member is not attached to the material 161 when the material 161 is plate-shaped but is attached to the material 161 after the material 161 is folded to a cross shape.

The method of this embodiment will now be described.

Figure 23:
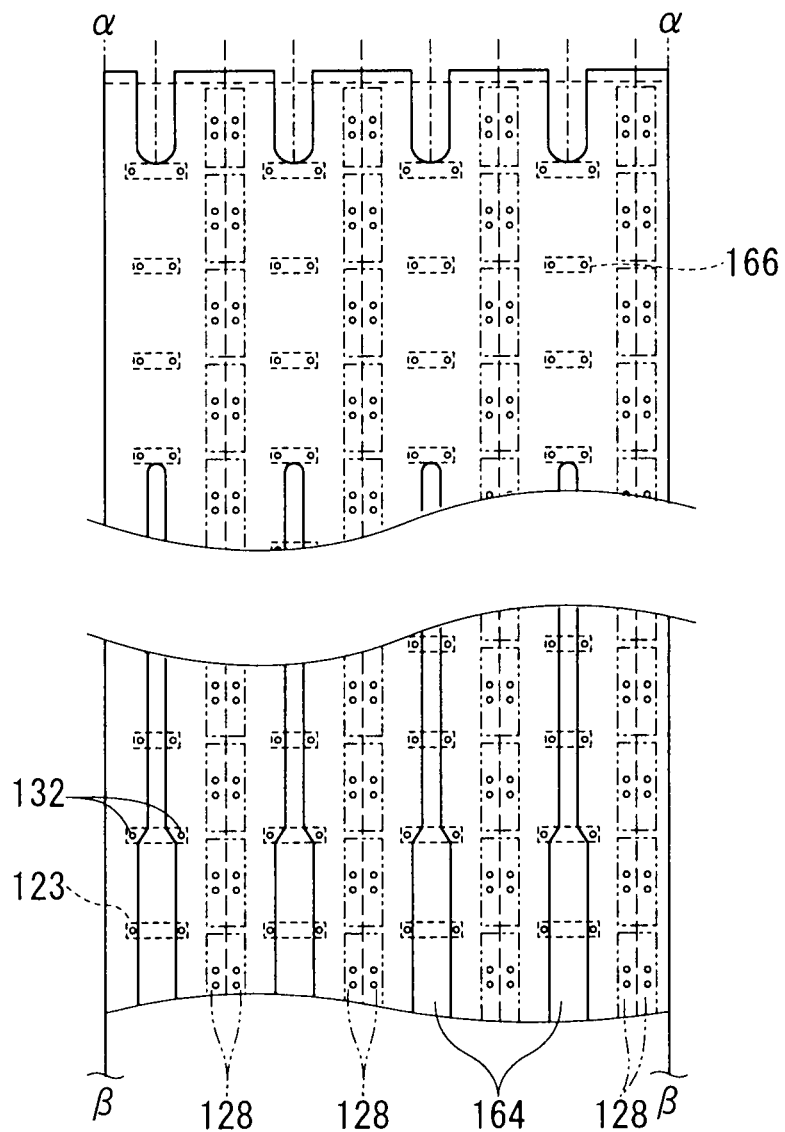
FIG. 23 is an enlarged view of a principal portion of the hafnium sheet shown in FIG. 21.

In a first step, the hafnium sheet covered with zircaloy is processed in advance such that the material 161 is formed as shown in FIGS. 21 to 23, the material 161 is mountain-folded at a right angle along the folding lines 171b, 171d, 171f and 171h passing through the regions between the notches 164 and 165, and both ends of the material 161 represented by the line α-β are welded to each other, whereby an object, not shown, having a square shape in cross section is obtained.

In a second step, the object is valley-folded at a right angle along the folding lines 171a, 171c, 171e and 171g passing through the notches 164 and 165. A welding line corresponding to the line α-β is located between one of mountain-folded portions and one of valley-folded portions. This is probably because metal crystals in the welding portion are reformed by the welding and the presence of the welding line at the mountain- or valley-folded portion may cause the deterioration of health due to irradiation.

In the second step, the mountain-folded portions are further folded at an angle of 180 degrees to form outer end portions of the wings 124 and the valley-folded portions are further folded at an angle of 90 degrees to form portions of the wings 124 that are located near the center axis of the control rod 111. With reference to FIG. 23, outer rods, that is, short hafnium rods 128 that are wing end-reinforcing members are pinned to the mountain-folded portions. The tie crosses 123 are pinned using pairs of holes 174 located between window-shaped holes (longitudinal holes) that are intermittently arranged in the valley-folded portions in the axial direction of the control rod 111. The pins used are made of zircaloy or hafnium. The control rod 111 shown in FIGS. 19 and 20 is obtained.

The distance between the line α-αβ and line β-β shown in FIG. 21 need to be 3 m or more, and the line α-α usually have a length of about 1 m. Therefore, the control rod 111 may be manufactured so as to have a length exceeding 3 m so that a plurality of neutron absorbing plates 135 are prepared, processed as shown in FIG. 21, and then welded to each other in the axial direction thereof. In this case, the same nucleic properties (blade history-improving properties) as described in the twelfth or thirteenth embodiment can be obtained in such a manner that holes disposed in valley-folded portions are varied in size in the axial direction of the control rod 111 (the holes located closer to the tailing end of the control rod 111 have larger sizes in the wing end direction). The hafnium sheet may be replaced with a hafnium-zirconium alloy sheet.

Fifteenth Embodiment

Figure 24:
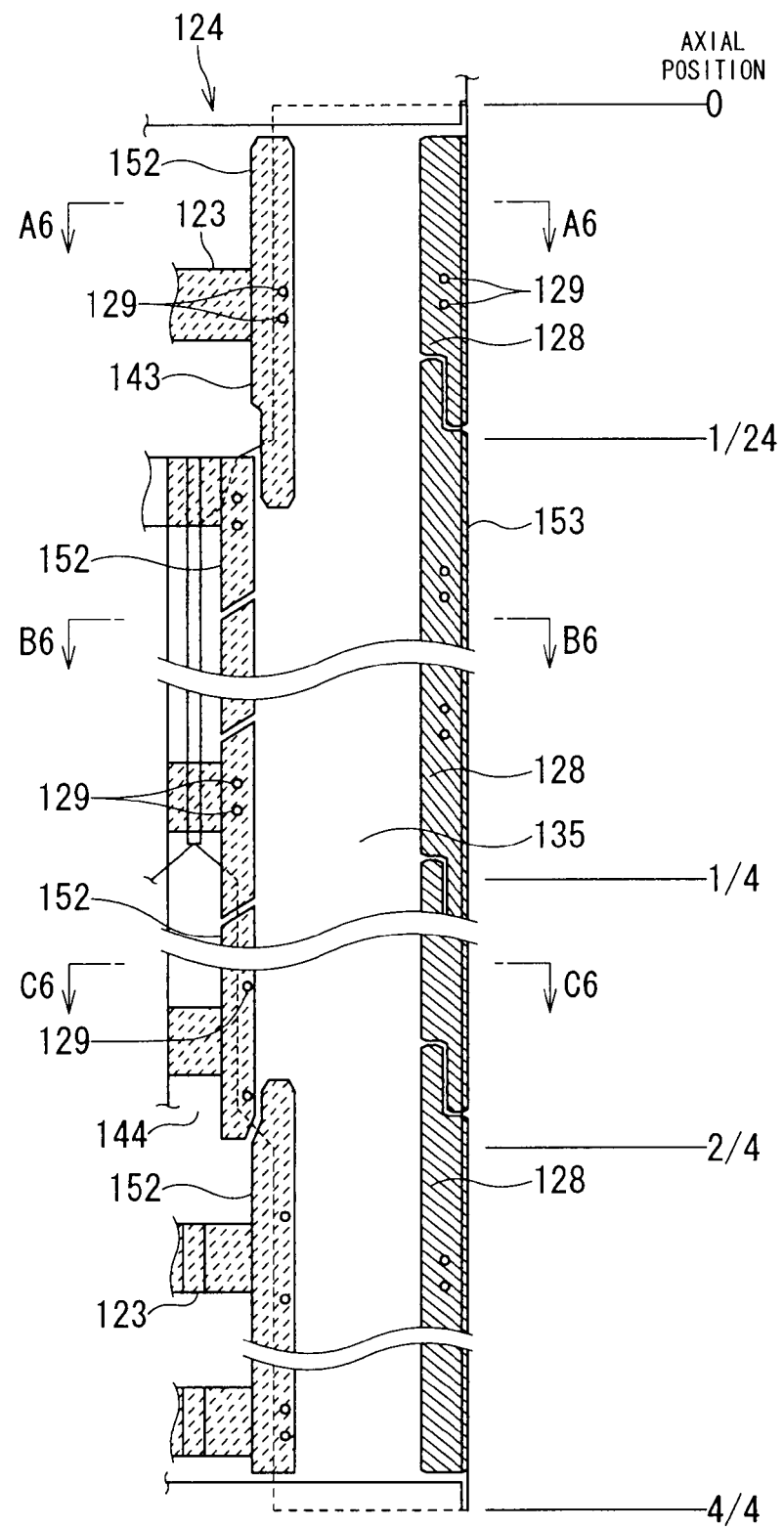
FIG. 24 is a sectional view of one of wings included in a control rod according to a fifteenth embodiment of the present invention.
Figure 25A:
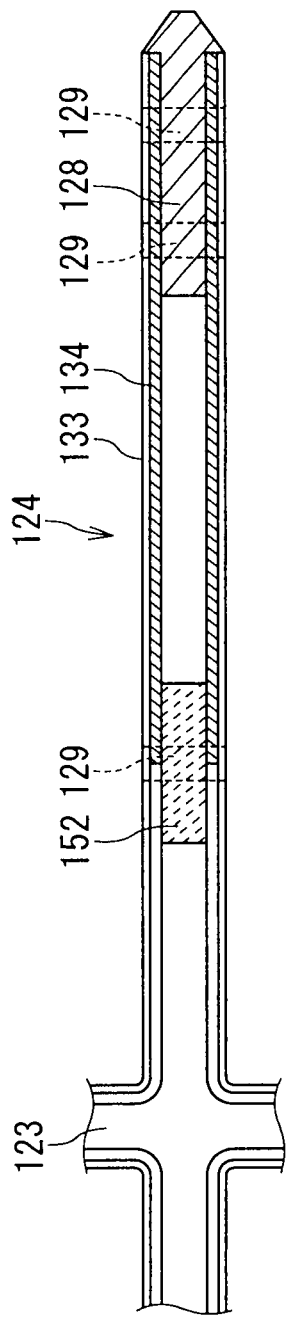
FIGS. 25A, 25B and 25C are sectional views of the wing taken along the line A6-A6, the line B6-B6 and the line C6-C6, respectively, of FIG. 24.
Figure 25B:
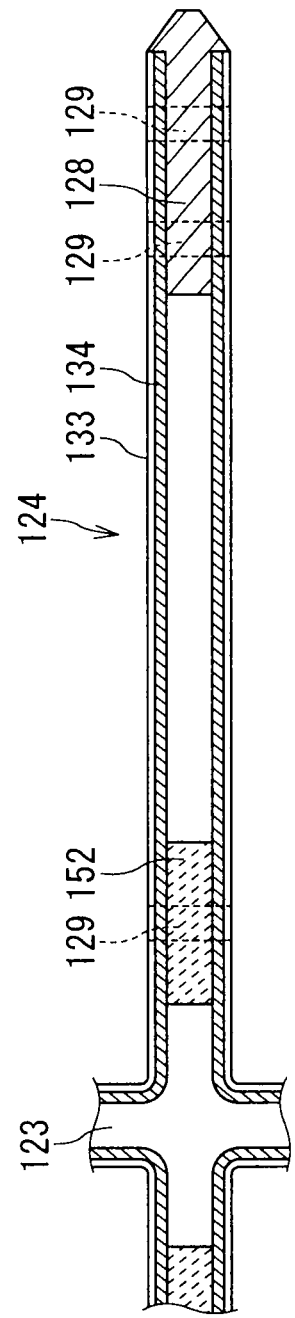
Figure 25C:
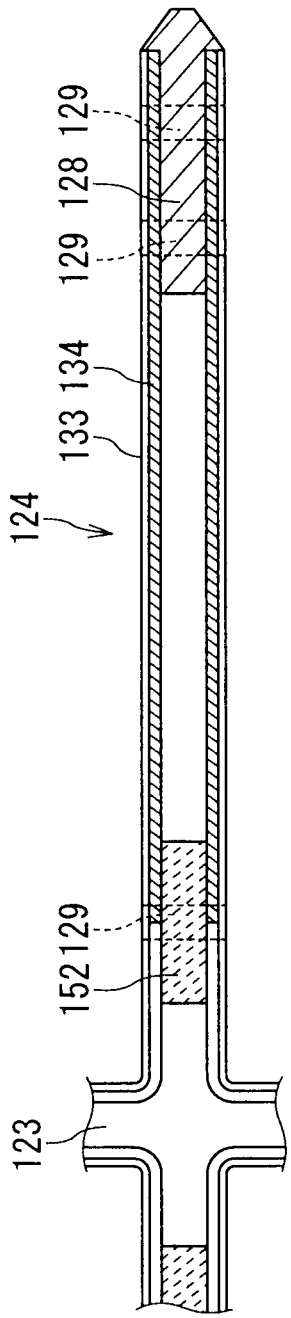

FIG. 24 is a sectional view of one of wings 124 included in a control rod according to a fifteenth embodiment of the present invention. FIG. 25A is a sectional view of the wing 124 taken along the line A6-A6 of FIG. 24. FIG. 25B is a sectional view of the wing 124 taken along the line B6-B6 of FIG. 24. FIG. 25C is a sectional view of the wing 124 taken along the line C6-C6 of FIG. 24.

This embodiment focuses on a method of manufacturing the control rod and measures against the blade history in view of the transverse cross-sectional structure of the control rod. The method of this embodiment is simpler than that described with reference to FIGS. 19 to 23.

FIGS. 24 and 25A to 25C are substantially the same as FIGS. 19 and 20A to 20C and therefore will not be described herein.

In this embodiment, longitudinal holes are intermittently provided in folded portions, pairs of small holes for fixing a tie cross 123 are provided between the longitudinal holes, and the folded portions are valley-folded. Mountain-folded portions are to be finally formed into the ends of the wings 124. Short hafnium rods 128 are attached to the mountain-folded portions with pins 129, made of zircaloy or hafnium, inserted in the fitting holes.

In this embodiment, the wings 124 usually have a width of 50 cm or less and therefore may be separately manufactured. The wings 124 can be manufactured from a single material if the wings 124 have a length exceeding 3 m. Holes, as well as those described in the above embodiments, located closer to the tailing end of the control rod preferably expand toward the wing ends.

Sixteenth Embodiment

Figure 26:
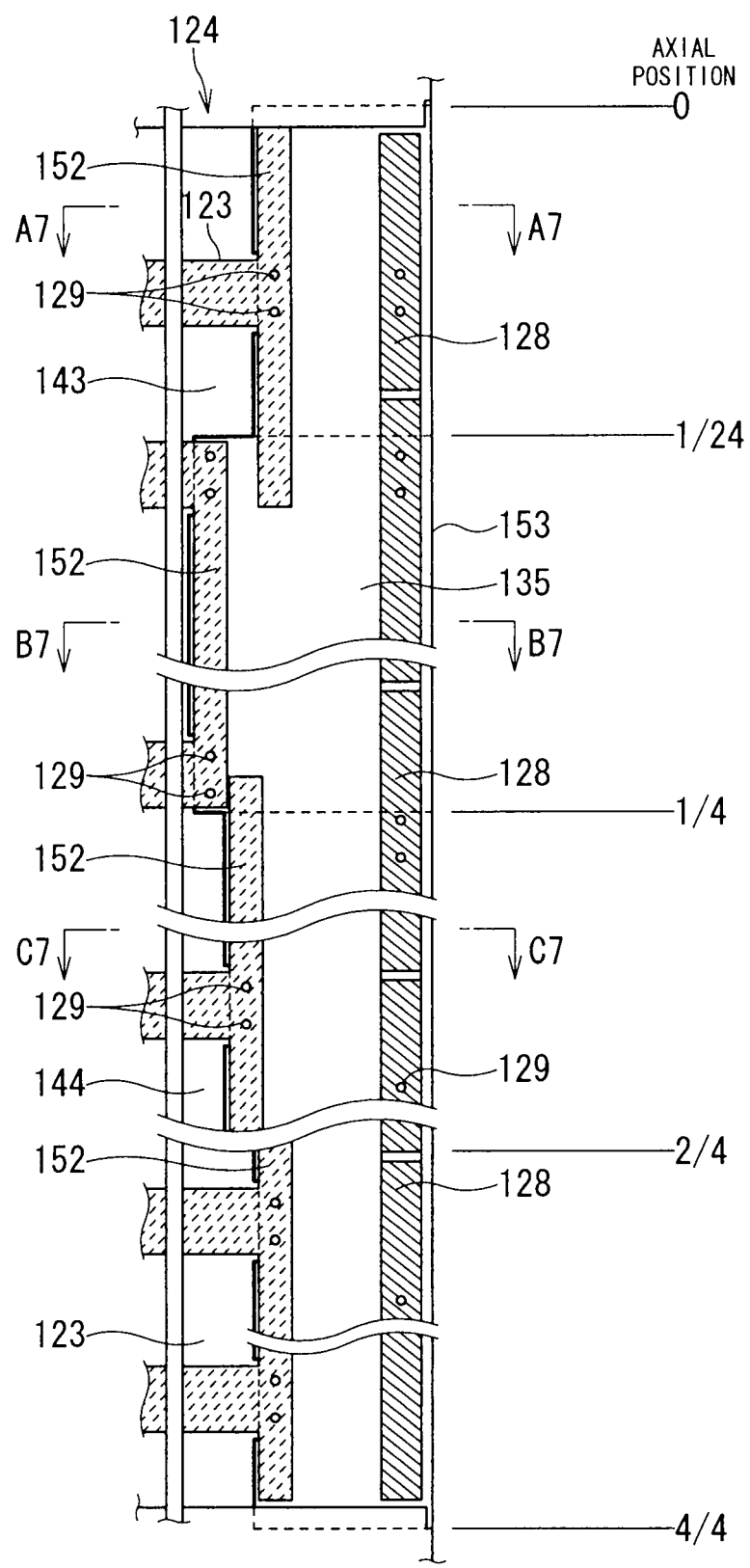
FIG. 26 is a sectional view of one of wings included in a control rod according to a sixteenth embodiment of the present invention.

FIG. 26 is a sectional view of one of wings 124 included in a control rod, according to a sixteenth embodiment of the present invention, for nuclear reactors. FIG. 27A is a sectional view of the wing 124 taken along the line A7-A7 of FIG. 26. FIG. 27B is a sectional view of the wing 124 taken along the line B7-B7 of FIG. 26. FIG. 27C is a sectional view of the wing 124 taken along the line C7-C7 of FIG. 26.

This control rod has substantially the same configuration as that of the control rod of the fifteenth embodiment. In this embodiment, as shown in FIG. 26, a zircaloy coating 133a is provided on a surface of each hafnium sheet 134, another surface of the hafnium sheet 134 opposing to the zircaloy coating 133a is polished so as to have a reduced effective area, the hafnium sheet 134 is rolled into a cylindrical shape so that the zircaloy coating 133a is located outside, and end portions of the rolled hafnium sheet 134 are then welded to each other, whereby a cylinder is formed. The cylinder is pressed into a flattened tube 181 as shown in this figure.

Three types of cylinders having different diameters are prepared and then formed into the flattened tubes 181 as shown in FIG. 27A, 27B or 27C. A notch fitting over a tie cross 123 is provided in a portion of the flattened tube 181 located near the center axis of this control rod. The center axis-side portion of the flattened tube 181 is fixed to short spacers 152, which is fixed to the composite absorbing plate.

The distance from the center axis thereof to a first portion of each flattened tube 181 is large as shown in FIG. 27A, the first portion extending from the leading end of the flattened tube 181 and having a length equal to one 24th (1/24) of the length of the flattened tube 181. The distance from the center axis thereof to a second portion of the flattened tube 181 is also large, the second portion extending from the tailing end of the flattened tube 181 and having a length equal to one half (1/2) of the length of the flattened tube 181. The distance from the center axis thereof to a third portion of the flattened tube 181 is the least as shown in FIG. 27B, the third portion extending from the first portion and having a length equal to one fourth (1/4) of the length of the flattened tube 181. As shown in FIG. 27C, the distance from the center axis thereof to a fourth portion of the flattened tube 181 is between that shown in FIG. 27A and that shown in FIG. 27B, the fourth portion extending from the third portion.

This configuration is determined on the basis of the same concept as that described in the above embodiments.

Seventeenth Embodiment

Figure 28A:
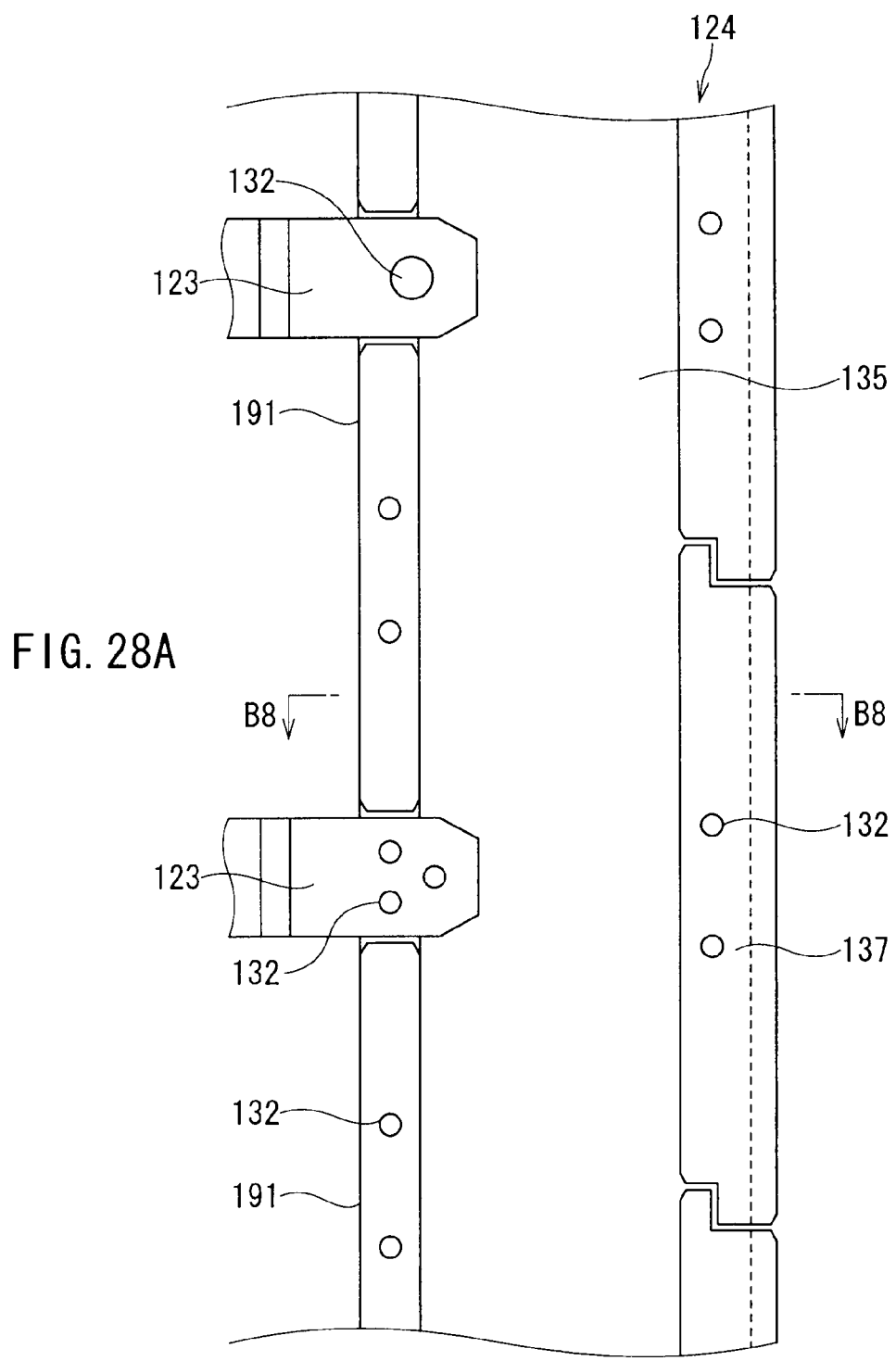
FIG. 28A is a vertical sectional view of a leading portion of one of wings included in a control rod according to a seventeenth embodiment of the present invention.
Figure 28B:
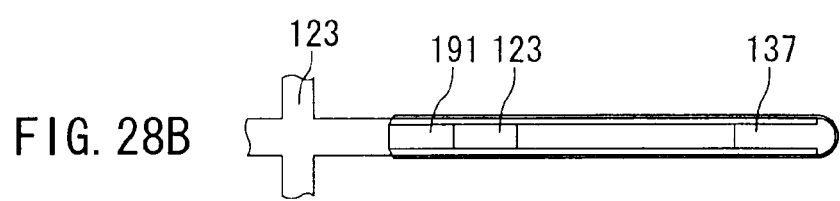
FIG. 28B is a sectional view of the wing taken along the line B8-B8 of FIG. 28A.
Figure 29A:
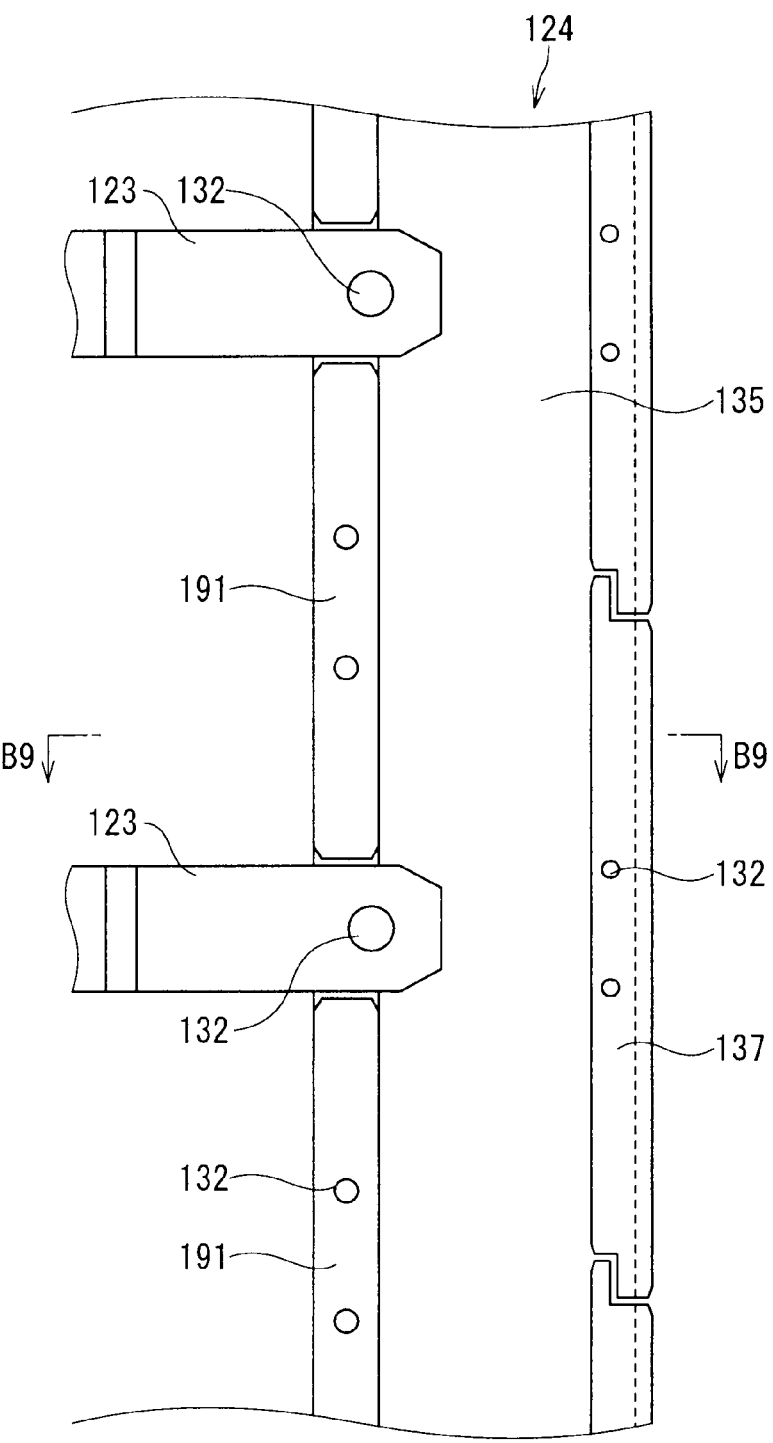
FIG. 29A is a vertical sectional view of a tailing portion of the wing shown in FIG. 28B.
Figure 29B:
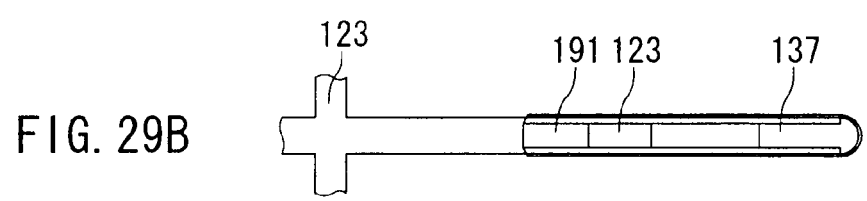
FIG. 29B is a sectional view of the wing taken along the line B9-B9 of FIG. 29A.

FIG. 28A is a vertical sectional view of a leading portion (an upper portion) of one of wings 124 included in a control rod, according to a seventeenth embodiment of the present invention, for nuclear reactors. FIG. 28B is a sectional view of the wing 124 taken along the line B8-B8 of FIG. 28A. FIG. 29A is a vertical sectional view of a tailing portion (a lower portion) of the wing 124. FIG. 29B is a sectional view of the wing 124 taken along the line B9-B9 of FIG. 29A.

The control rod of this embodiment has substantially the same configuration as that described in the sixteenth embodiment except that the distance from the center axis of the control rod to a leading portion of the composite absorbing plate 135 is different from that from the center axis thereof to a leading portion thereof.

With reference to FIGS. 28A and 28B, in the upper half of the wing 124, short hafnium rods 137 are fixed to an outer end portion of the wing 124 by means of the pins 132 located near the centers of the hafnium rods 137. Short spacers 191 made of hafnium are fixed to a portion of the wing 124 with the pins 132, the portion being located near the center axis of the control rod. Each portion of the tie cross 123 is fixed between the spacers 191 adjacent to each other in the axial direction of the control rod with one or three of the pins 132.

In order to solve a problem caused by the difference in the irradiation growth, one of the pins 132 may be preferably used in some cases. Three of the pins 132 may be used to solve this problem if an appropriate clearance is formed.

With reference to FIGS. 29A and 29B, the control rod has substantially the same configuration as that described in the seventh embodiment except that the distance from the center axis of the control rod to the leading portion of the composite absorbing plate 135 is different from that from the center axis thereof to the leading portion thereof. In the lower half of the wing 124, the short hafnium rods 137 are fixed to an outer end portion of the wing 124 with the pins 132 located near the centers of the hafnium rods 137. Short zircaloy spacers 191 are fixed to a portion of the wing 124 with the pins 132, the portion being located near the center axis of the control rod. Each portion of the tie cross 123 is fixed between the zircaloy spacers 191 adjacent to each other in the axial direction of the control rod with one or three of the pins 132.

In order to solve a problem caused by the difference in the irradiation growth, one of the pins 132 may be preferably used in some cases. Three of the pins 132 can be used to solve this problem if an appropriate clearance is formed.

What is claimed is:

1. A control rod for nuclear reactors comprising:
   four wings including neutron absorbing hafnium;
   a front end structural member which has a cross shape in cross section and includes brackets bonded to leading ends of the wings; and
   a terminal end structural member which has a cross shape in cross section and includes brackets bonded to tailing ends of the wings, wherein
   the four wings are bonded to a wing bonding member including a cross-shaped center shaft so as to form a cross shape in such a manner that the wings are spaced from each other at predetermined intervals in an axial direction,
   at least the front end structural member and the wing bonding member are made of a zirconium alloy containing hafnium of which the hafnium content is greater than or equal to that of natural compositions,
   the wings have principal portions including neutron absorbing plates having neutron absorbing portions, each of the wings has an outer surface which is configured to be opposed to a fuel assembly, and each of the wings includes a composite member that includes a hafnium plate or a hafnium-zirconium alloy plate diluted by zirconium and a zirconium plate that is of pure zirconium, the zirconium plate covering the outer surface of each wing that is configured to be opposed to the fuel assembly, and
   the neutron-absorbing plates are opposed to each other in such a manner that trap spaces in which reactor water is present are disposed between the neutron absorbing plates, and a thickness of each neutron absorbing plate is substantially uniform in a direction in which the control rod is inserted or withdrawn.

2. The control rod according to claim 1, further comprising tie rods, disposed in the wings, for connecting the front end structural member and the terminal end structural member to each other, wherein the neutron-absorbing plates are mounted in the wings so as to slide from the leading ends toward the tailing ends of the wings or from the tailing ends toward the leading ends of the wings.

3. The control rod according to claim 2, wherein the tie rods are made of hafnium.

4. The control rod according to claim 1, further comprising wing end reinforcing members which are disposed in the trap spaces between the neutron absorbing plates and which slides in the axial direction of the control rod.

5. The control rod according to claim 4, wherein the wing end reinforcing members are made of hafnium.

6. The control rod according to claim 1, wherein each of the neutron absorbing portions has a first portion extending from the leading end of the neutron-absorbing portion and having a length equal to 1/24 to 2/24 of a length of the neutron absorbing portion, a second portion extending from the first portion and having a length equal to a difference obtained by subtracting the length of the first portion from 1/4 to 1/2 of the length of the neutron absorbing portion, and a third portion extending from the tailing end of the neutron absorbing portion, in which the second portion has a width greater than that of the third portion, and an outer end of a leading portion of each wing is aligned with that of a tailing portion of the wing.

7. The control rod according to claim 6, wherein the first portion has a width less than that of the second portion.

8. The control rod according to claim 1, further comprising a hafnium-zircaloy composite material and short narrow hafnium rods, wherein the hafnium-zircaloy composite material is repeatedly mount-folded and valley-folded so as to provide mount-folded and valley-folded portions which are arranged at equal intervals and which extend in parallel to each other, the valley-folded folded portions are brought close to each other so that the folded hafnium-zircaloy composite material has a cross shape in horizontal cross section, and the hafnium rods are arranged in end portions of the wings in form of spacers.

9. The control rod according to claim 8, further comprising a tie cross made of zircaloy, wherein the valley-folded portions partially have longitudinal holes regularly and intermittently arranged in the axial direction and portions of the tie cross are arranged above and below the longitudinal holes so as to maintain the cross shape and improve mechanical strength.

10. The control rod according to claim 1, further comprising short narrow hafnium rods functioning as spacers, wherein the four composite members are bent so as to provide an L-shape, bent portions of the composite members are brought close to each other so as to be directed to a center of a cross shape, and the hafnium rods are attached to end portions of the bent composite members.

11. The control rod according to claim 10, further comprising a tie cross made of zircaloy, wherein the bent portions partially have longitudinal holes regularly and intermittently arranged in the axial direction and portions of the tie cross are arranged above and below the longitudinal holes so as to maintain the cross shape and improve mechanical strength.

12. The control rod according to claim 1, wherein each wing is formed so that two of the composite members are opposed to each other with a space therebetween and spacers for keeping spaces are fixed to both ends of the composite members in an inserting or withdrawing direction and a perpendicular direction, and the four wings are bonded to a tie cross including a cross-shaped center shaft so as to form a cross shape in such a manner that the wings are spaced from each other at predetermined intervals in the axial direction.

13. The control rod according to claim 1, wherein each wing is formed so that one of the composite members is bent so as to provide a U-shape with a space, and a plurality of short spacers are fixed to end portions of the bent composite member located on the side close to a cross-shaped center shaft included in a tie cross, the tie cross is spaced from the wing at a predetermined distance in the axial direction, and the four wings are bonded to each other so as to form a cross shape.

14. The control rod according to claim 1, wherein each wing is formed so that one of the composite members is bent so as to provide a cylindrical shape, both end portions of the bent composite member are bonded to each other to form a cylinder, which is then pressed into a flattened tube, and a plurality of short spacers are fixed to outer end portions and inner portions of the flattened tube, the inner portions being located on the side close to a cross-shaped center shaft, which is included in a tie cross, and the four wings are bonded to form a cross shape so that the tie cross is spaced from the wings at a predetermined distance in the axial direction.

15. The control rod according to claim 1, wherein the wings are fixed with members, located in a vicinity of end portions of the cross-shaped center shaft for preventing the wings from being opened.

16. The control rod according to claim 1, wherein spacers, made of hafnium, disposed in the outer end portions of the wings are short rods and center portions of the short rods are fixed to the composite members.

17. The control rod according to claim 1, wherein
each of the zirconium plates has a thickness in the range of approximately 0.2 to 0.5 millimeters, and
each of the composite members has a thickness in the range of approximately 2 to 2.5 millimeters.

18. The control rod according to claim 1, wherein each of the composite members includes another different zirconium plate, the zirconium plate and the another different zirconium plate sandwiching the hafnium plate or the hafnium-zirconium alloy plate.

19. A control rod for nuclear reactors comprising:
four wings including neutron absorbing hafnium;
a front end structural member which has a cross shape in cross section; and
a terminal end structural member which has a cross shape in cross section, wherein
the four wings are bonded to a wing bonding member including a cross-shaped center shaft so as to form a cross shape in such a manner that the wings are spaced from each other at predetermined intervals in an axial direction,
at least the front end structural member and the wing bonding member are made of a zirconium alloy containing hafnium of which the hafnium content is greater than or equal to that of natural compositions,
the wings have principal portions including neutron absorbing plates having neutron absorbing portions, each of the wings has an outer surface which is configured to be opposed to a fuel assembly, and each of the wings includes a composite member that includes a middle plate, which is a hafnium plate or a hafnium-zirconium alloy plate diluted by zirconium, a first zirconium plate, and a second zirconium plate, the first zirconium plate being bonded to a top surface of the middle plate, and the second zirconium plate being bonded to a bottom surface of the middle plate, the top surface and the bottom surface of the middle plate being covered by the first and second zirconium plates, respectively, without side surfaces of the middle plate being covered by zirconium plates, and the first zirconium plate covering the outer surface of each wing that is configured to be opposed to the fuel assembly, and
the neutron-absorbing plates are opposed to each other in such a manner that trap spaces in which reactor water is present are disposed between the neutron absorbing plates, and a thickness of each neutron absorbing plate is substantially uniform in a direction in which the control rod is inserted or withdrawn.

* * * * *